US008908086B2

(12) United States Patent (10) Patent No.: US 8,908,086 B2
Kawai (45) Date of Patent: Dec. 9, 2014

(54) DRIVING APPARATUS FOR SHAKE CORRECTION AND IMAGING APPARATUS USING THE SAME

(75) Inventor: Sumio Kawai, Tokyo (JP)

(73) Assignee: Olympus Imaging Corporation (JP)

( * ) Notice: Subject to any disclaimer, the term of this patent is extended or adjusted under 35 U.S.C. 154(b) by 0 days.

(21) Appl. No.: 13/448,963

(22) Filed: Apr. 17, 2012

(65) Prior Publication Data

US 2012/0268642 A1 Oct. 25, 2012

(30) Foreign Application Priority Data

Apr. 21, 2011 (JP) ................................. 2011-095012

(51) Int. Cl.
| H04N 5/232 | (2006.01) |
| G03B 13/00 | (2006.01) |
| H04N 5/225 | (2006.01) |
| H04N 5/228 | (2006.01) |
| G02B 27/64 | (2006.01) |
| G03B 5/08 | (2006.01) |
| G03B 17/14 | (2006.01) |

(52) U.S. Cl.
CPC ............ *G02B 27/646* (2013.01); *G03B 5/08* (2013.01); *H04N 5/23248* (2013.01); *H04N 5/2253* (2013.01); *G03B 2205/0061* (2013.01); *G03B 17/14* (2013.01); *G03B 2205/0069* (2013.01); *G03B 2205/0038* (2013.01)
USPC ... 348/352; 348/335; 348/208.99; 348/208.2; 348/208.4

(58) Field of Classification Search
CPC .......... H04N 5/23248; H04N 5/23287; H04N 5/23258; H04N 5/2257; H04N 5/23216; H04N 5/23251; H04N 5/23254; H04N 5/23267; H04N 5/2355; G02B 27/646; G02B 7/102
USPC ................... 348/208.4, 208.7, 208.8, 208.11, 348/208.13, 208.16, 335, 352, 373
See application file for complete search history.

(56) References Cited

U.S. PATENT DOCUMENTS

| 8,084,920 B2 | 12/2011 | Kawai |
| 2009/0009657 A1* | 1/2009 | Kawai ........................ 348/373 |

FOREIGN PATENT DOCUMENTS

| CN | 101334571 A | 12/2008 |
| JP | 2008-129326 | 6/2008 |
| JP | 2010-191298 | 9/2010 |
| JP | 2010-282028 | 12/2010 |

OTHER PUBLICATIONS

Office Action issued in counterpart Chinese Patent Application No. 201210117009.1 on Feb. 11, 2014, consisting of 17 pp. (English translation provided).
Office Action issued in counterpart Chinese Patent Application No. 201210117009.1 on Aug. 19, 2014, consisting of 23 pp. (English translation provided).

* cited by examiner

*Primary Examiner* — Twyler Haskins
*Assistant Examiner* — Padma Haliyur
(74) *Attorney, Agent, or Firm* — Volpe and Koenig, P.C.

(57) ABSTRACT

Provided are a driving apparatus and an imaging device having the driving apparatus mounted thereon, the driving apparatus being capable of performing, with a simple configuration, driving in the Z-axis direction in addition to driving in a direction along the XY plane, reducing friction at the time of driving, and performing precise position holding at the time of stop. A driving apparatus includes: a frame, a contact body supported by the frame; a holder pressed against the contact body to be supported thereby; a VCM for relatively moving the frame in a direction along a support plane formed by the contact body; and a transducer for displacing, relative to the frame, the contact body in the Z-axis direction. When driving, the transducer causes the contact body to vibrate in the Z-axis direction so as to reduce a frictional force between the contact body and the holder.

8 Claims, 17 Drawing Sheets

FIG. 20
(a)
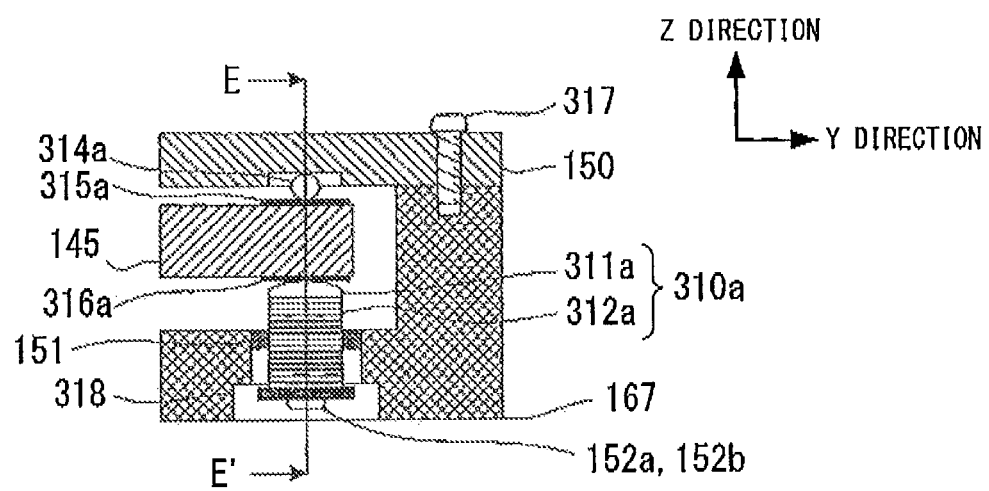
(b)
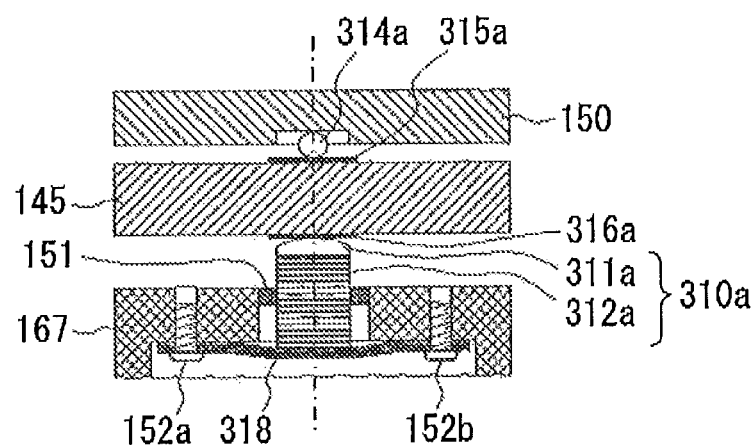

DRIVING APPARATUS FOR SHAKE CORRECTION AND IMAGING APPARATUS USING THE SAME

CROSS REFERENCE TO RELATED APPLICATION(S)

The present application claims priority from Japanese Patent Application No. 2011-095012 filed on Apr. 21, 2011, the contents of which are incorporated herein by reference.

FIELD OF INVENTION

The present invention relates to a driving apparatus for driving a movable body using an actuator such as an electromagnetic motor, an ultrasonic motor, or a piezoelectric body, so as to move the movable body in a predetermined direction, and also relates to imaging equipment such as a digital camera or a toolmaker's microscope which performs camera shake correction or focal position detection with the use of the driving apparatus.

BACKGROUND

Conventionally, there have been various applications available for an electric stage which is capable of moving in the X-axis, Y-axis, and Z-axis directions as well as rotating about each of the axis, the X axis, the Y axis, the Z axis being defined as three axes perpendicular to one another in a rectangular coordinate system.

One of the specific examples of an image pickup device having a camera shake correction function may include a camera. As the shake correction function for cameras, there is known a camera shake correction function for detecting, using a shake detector such as an angular velocity sensor, a shake in a camera pitch direction and a shake in a camera yaw direction, and shifting, in a horizontal direction and in a vertical direction, part of an image pickup optical system or the imaging element independently of each other in a direction of canceling the shake, in a plane perpendicular to a photographing optical axis based on a signal indicative of the detected shake, to thereby correct blurring of an image on an image pickup plane of an imaging element.

A camera shake correction mechanism for realizing the camera shake function described above employs a driving unit for moving some photographing lenses or the image sensor itself in the horizontal direction and the vertical direction in a plane perpendicular to the photographing optical axis. The driving unit needs to be precisely driven (micro driven) as being operated following a camera shake, and also required to perform accurate positioning of the movable body (positioning on the image pickup plane) relative to the photographing lens, when driven. Further, the driving unit is required to have a large drive force in order to obtain an acceleration necessary for control against the gravitational force of the mobile body, and also to have a self-retainability capable of retaining a position of the movable body even after power-off. The driving unit is, naturally, required have a mechanism which is compact and inexpensive, rather than having a complicated mechanism. On the other hand, there is a demand for a driving mechanism capable of driving the movable body in a direction perpendicular to an image pickup plane in order to perform camera shake correction in further advanced macro photographing and focal point detection in the contrast system.

Other specific examples thereof include a stage in a microscope for placing an object to be observed. Such a stage is required to move freely in the XY plane so as to move a desired position of the object to be observed into the observation field of the microscope. Further, the stage is provided with a mechanism capable of precisely moving the stage in the Z-axis direction perpendicular to the XY plane so as to make adjustments in focal positioning.

For example, Japanese Patent Document Laid-Open No. 2008-129326 discloses a driving mechanism which includes: a plurality of substrate supporting projections each having a smooth surface at the distal end thereof, the substrate supporting projections being formed on a base yoke plate; a pressing pin having a smooth surface at the distal end thereof, the pressing pin being pressed by a coil spring, the substrate supporting projections and the pressing pin clamp-holding a movable portion therebetween; a coil provided on the movable portion side; and a magnet provided on the base yoke plate side, the coil and the magnet forming a voice coil motor (hereinafter, referred to as VCM), to thereby allow movements in the X-axis direction (horizontal direction) and in the Y-axis direction (vertical direction) within a plane defined by the end surfaces of the base supporting projections and also allow rotation about an axis perpendicular to the XY plane.

However, in this mechanism, the movable frame is constantly under a frictional force of pressure-support, which leads to a problem that the VCM for moving the movable frame is reduced in power due to the frictional force. Further, the movable frame is held by a fixed frame via the frictional force of pressure-support when the operation of the VCM is stopped. However, if the holding power is increased so as to increase the holding performance, the frictional force also increases, which may further reduce the power of the VCM. In addition, although this driving mechanism allows, with a simple configuration, movements in the X-axis direction (horizontal direction) and in the Y-axis direction (vertical direction) and also allows rotation about an axis perpendicular to the XY plane, driving in a direction perpendicular to the XY plane (optical axis direction of the camera, i.e., Z-axis direction) remains unrealized. If the drive control in the Z-axis direction can be realized, it can be applied to a vibrating operation (hereinafter, referred to as wobbling) in the Z-axis direction for focus detection of the camera, a focusing operation, or a camera shake correction operation in the optical axis direction which is effective in macro photography.

Japanese Patent Application Laid-Open No. 2010-282028 discloses a lens unit which includes an actuator (in the form of VCM) for linearly moving a transducer with respect to a stator, in which the transducer and the stator are pressed against each other when the actuator for moving does not generate a drive force, while the pressing force between the transducer and the stator is cancelled by an actuator for the breaking part (specifically, a piezoelectric body) when the actuator for moving generates a drive force.

However, this driving mechanism is a single-axis driving mechanism for driving a transducer in the Z-axis direction (optical axis direction) relative to the stator, without implementing movements in multi-degree of freedom. In particular, the movement in the direction of the pressing force is completely out of control. When the movable frame is driven relative to the fixed frame by the actuator for moving, the pressing force is released, with the result the play in the mechanism randomly varies in position.

Japanese Patent Document Laid-Open No. 2010-191298 discloses a microscope including: a stage for placing thereon an object having a plurality of observation points; an automatic focusing device; an objective lens driving portion for drive-controlling the observation positions; and an offset lens driving portion. According to this microscope, when the automatic focusing device detects a focus error at a certain observation position, the relative position of the observation position in the optical axis direction is calculated based on the focus signals obtained at the plurality of observation positions that have been already observed, so as to control the lens driving portion and the offset lens driving portions, to thereby perform focusing operation.

However, in this microscope, a sample stage driving mechanism for position adjustment in the sample plane and a lens driving mechanism for focus position adjustment in the optical axis direction need to be provided separately from each other. As a result, the microscope is increased in size and becomes more complicated in configuration.

SUMMARY

The present invention provides a driving apparatus, including:

a first member;

a contact portion supported by the first member;

a second member pressed against the contact portion to be supported thereby;

a first driving mechanism for moving the second member relative to the first member in a direction along a support plane formed by the contact portion; and a second driving mechanism for displacing, relative to the first member, the contact portion in the pressing direction, in which the second driving mechanism vibrates the contact portion in the pressing direction so as to reduce a frictional force between the contact portion and the second member.

Preferably, the second driving mechanism may displace, in the pressing direction, the support plane supporting the second member in the pressing direction.

More preferably, the contact portion may be changed in vibration amplitude so as to control the displacement of the support plane.

Alternatively, the contact portion may be displaced in vibration center, so as to control the displacement of the support plane.

Favorably, the second driving mechanism may include a piezoelectric body, and the contact portion may be a contact body adhered to the piezoelectric body.

Further, there may be provided a plurality of the contact portions and a plurality of the second driving mechanisms, so that the contact portions may be made different from one another in vibration amplitude or displacement of the vibration center, to thereby adjust the tilt of the second member with respect to the first member.

The present invention provides an imaging apparatus, including:

a fixed frame fixed to a main body;

a shake detector which is fixed to the main body and detects a shake;

a contact portion supported by the fixed frame;

a movable frame pressed against the contact portion to be supported thereby;

an image sensor fixed to the movable frame;

a photographing optical system which is supported by the main body and has an optical axis in a direction perpendicular to a support plane formed by the contact portion, the photographing optical system forming an object image on the image sensor;

a first driving mechanism for moving the movable frame in a direction perpendicular to the optical axis of the photographing optical system; and a second driving mechanism for displacing, relative to the fixed frame, the contact portion in the optical axis direction, in which the second driving mechanism moves the contact portion in the optical axis direction so as to reduce a frictional force between the contact portion and the movable frame, and in which the first driving mechanism moves the image sensor so as to compensate the shake based on a signal from the shake detector.

The present invention provides another imaging apparatus, including:

a fixed frame fixed to a main body;

a contact portion supported by the fixed frame;

a movable frame pressed against the contact portion to be supported thereby;

an image sensor fixed to the movable frame;

a photographing optical system which is supported by the main body and has an optical axis in a direction perpendicular to a support plane formed by the contact portion; the photographing optical system forming an object image on the image sensor;

a first driving mechanism for moving the movable frame in a direction perpendicular to the optical axis of the photographing optical system; and a second driving mechanism for displacing, relative to the fixed frame, the contact portion in the optical axis direction, in which the second driving mechanism vibrates the contact portion in the optical axis direction so as to reduce a frictional force between the contact portion and the movable frame, and the contact portion is changed in vibration amplitude or displacement of the vibration center, so as to displace, relative to the fixed frame, the image sensor in the optical axis of the optical system, to thereby detect a focus position.

BRIEF DESCRIPTION OF THE DRAWINGS

FIGS. 20A and 20B are views each illustrating a configuration of a main part of a driving apparatus according to a third embodiment of the present invention.

DETAILED DESCRIPTION OF THE PREFERRED EMBODIMENT(S)

In the following, embodiments of the present invention are described with reference to the drawings. It should be noted that the present invention is not limited to the embodiments, and may be subjected to various modification without departing from the gist of the present invention.

First Embodiment

Imaging equipment according to this embodiment includes a driving apparatus of the present invention in order to perform camera shake correction in an image pickup unit including an image sensor which obtains image signals through photoelectric conversion. Here, a single lens electronic camera (digital camera) with interchangeable lenses is described as an example the application of the present invention.

Figure 1:
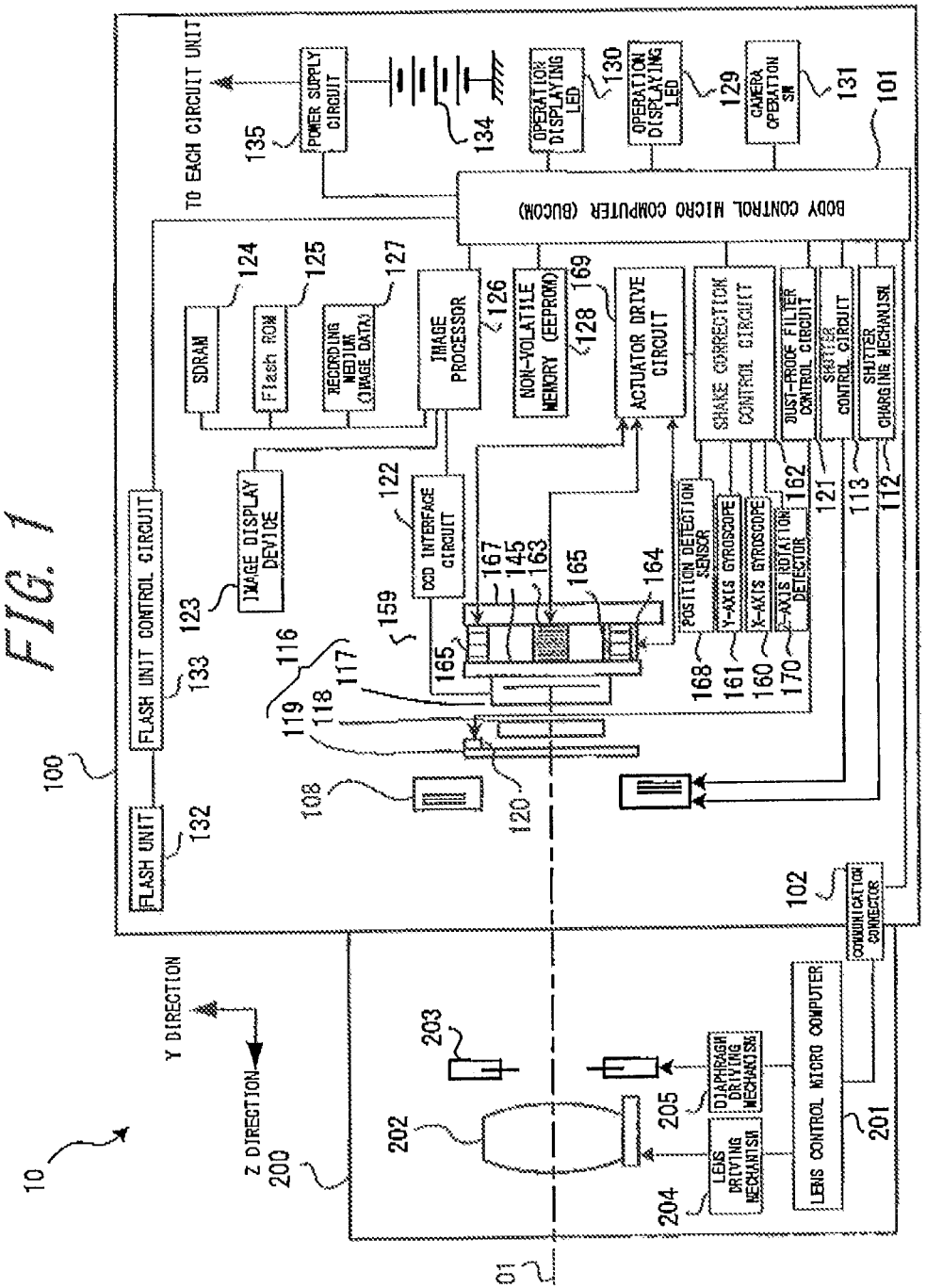
FIG. 1 is a block diagram schematically illustrating mainly an electric system configuration of a camera, to which a driving apparatus according to a first embodiment of the present invention is applied.

FIG. 1 is a block diagram schematically illustrating mainly an electric system configuration of a camera to which the driving apparatus according to the first embodiment of the present invention is applied. The camera of this embodiment is specifically implemented as a camera system 10, which includes, as illustrated in FIG. 1, a lens unit 200 (photographing optical system) serving as a photographing lens, and a body unit 100 (main body). The lens unit 200 is configured as detachable from the body unit 100.

The lens unit 200 has a photographing lens 202 for imaging an optical image of a subject and a focusing lens (not shown) for focus adjustment. The body unit 100 is configured by having, for example, an image pickup device 117 including image sensors referred to as, for example, charge coupled device (CCD) or CMOS sensor.

In the following description, a direction from the body unit to the object is referred to as front while a direction opposite thereto is referred to as back. Further, an axis which coincides with an optical axis O1 of an optical system formed of the lens unit 200 is defined as Z-axis, and two axes perpendicular to each other in a plane orthogonal to the Z axis are defined as X axis (axis in the horizontal direction) and Y axis (axis in the vertical direction), respectively.

In this embodiment, an operation of the lens unit 200 is controlled by a lens-controlling microcomputer (hereinafter, referred to as "Lucom") 201 disposed in the lens unit 200, while an operation of the body unit 100 is controlled by a body-controlling microcomputer (hereinafter, referred to as "Bucom") 101 disposed in the body unit 100.

With the lens unit 200 being mounted on the body unit 100, the Bucom 101 and the Lucom 201 are electrically connected to each other via a communication connector 102 in a communicable manner. Then, the Lucom 201 is configured to operate in conjunction with the Bucom 101 as being dependent thereon. A power supply circuit 135 disposed in the body unit 100 supplies electric power needed by each unit, via the communication connector 102.

The photographing lens 202 is held inside the lens unit 200. The lens unit 200 is detachable via a body mount (not shown) disposed in front (on the subject side) of the body unit 100 and a lens mount (not shown) disposed behind (on the image sensor side of) the lens unit 200. This detachable mechanism is configured as a so-called bayonet system. This configuration allows the camera system 100 to have various lens units to be interchangeably mounted as the lens unit 200 and perform photographing. For example, a lens unit with or without a wobbling function may be mounted, and it is possible contrast automatic focusing using the wobbling function of the present invention, which is described later with reference to a second embodiment, even when a lens unit without a wobbling function is mounted.

Further, the lens unit 200 has a diaphragm 203 disposed therein. The diaphragm 203 is driven by an actuator such as a stepping motor (not shown) disposed inside a diaphragm driving mechanism 205. Information on the lens unit 200, such as the focus distance, the focal length, and the F value of the photographing lens 202, is detected by a position encoder (not shown) and output to the Bucom 101 via the Lucom 201 and the communication connector 102.

The image pickup device 117 is held within the body unit 100 via an image pickup device moving mechanism 159 for moving the image pickup device. The image pickup device moving mechanism 159 is described later. Here, the image pickup device 117 is formed of a photoelectric conversion element such as a CCD or a CMOS. In this embodiment, an optical filter 118 such as a lowpass filter and a dust-proof filter 119 are disposed in front of the image pickup device 117, to thereby constitute an image pickup unit 116. A piezoelectric element 120 is attached to the periphery of the dust-proof filter 119. The piezoelectric element 120 is configured to be controlled by a dust-proof filter control circuit 121 so as to cause the dust-proof filter 119 to vibrate at a predetermined frequency determined based on the dimension and the material thereof. Dust attaching to the dust-proof filter 119 can be removed through the vibration of the piezoelectric element 120.

A shutter 108, which is in a form of a generally-called focal-plane shutter, is disposed in front of the dust-proof filter 119. Further, in the body unit 100, there are provided a shutter charging mechanism 112 and a shutter control circuit 113, the shutter charging mechanism 112 charging a spring that drives a front curtain and a rear curtain of the shutter 108, the shutter control circuit 113 controlling the movement of the front curtain and the rear curtain. The optical filter 118, the dust-proof filter 119, and the shutter 108 may be arbitrarily provided as necessary, and the camera system 10 may be configured without including those.

The image pickup device 117 is electrically connected to the image processer 126, via an image pickup device interface circuit 122 that controls the operation of the image pickup device 117. The image processor 126 is configured to generate an image based on signals output from the image pickup device 117.

The image processor 126 has a configuration of subjecting an image to predetermined image processing, using a storage area such as an SDRAM 124 or FlashROM 124.

The image processor 126 is electrically connected to an image display device 123 disposed to a rearward of the body unit 100 so that an image can be displayed on the image display device 123. The image display device 123 also functions as a so-called electronic viewfinder for displaying, in real time, a photographing composition captured by the camera system 10. Further, although this embodiment is configured without including an optical finder, there may be provided an optical finder of a so-called single lens reflex type.

A recording medium 127 is a recording medium such as a flash memory or an HDD, which is removably mounted on the body unit 100. The recording medium 127 records data such as an image (including sound in the case the image is a moving image) taken by the camera system 10.

A non-volatile memory 128 is a storage area, such as EEPROM, for storing control parameters necessary for controlling the camera system 10. The non-volatile memory 128 is disposed as being accessible from the Bucom 101.

The Bucom 101 has an operation displaying LED 130, a camera operation SW 131, a built-in flash unit 132, and a flash unit control circuit 133 connected thereto. The operation displaying LED 130 notifies, by a display output, a user of the operation state of the camera system 10. The flash unit control circuit 133 drives an external flash unit, which is not shown. The camera operation SW 131 is a switch group including operation buttons necessary for operating the camera system 10, such as a release SW, a mode change SW, and a power SW.

Further, a battery 134 serving as a power source and a power supply circuit 135 are provided in the body unit 100. The power supply circuit 135 converts the voltage of the battery 134 into a voltage needed by the circuit units forming the camera system 10, so as to supply the voltage to the circuit units. Further, there is provided a voltage detection circuit (not shown) for detecting a voltage change that occurs when a current is supplied via a jack (not shown) from an external power supply.

Next, description is given of the image pickup device moving mechanism 159 which includes a driving apparatus used in a camera shake correction function of the camera according to this embodiment. The body unit 100 includes the image pickup device moving mechanism 159 for holding the image pickup device 117 in a manner that allows movement in the X-axis direction, the Y-axis direction, and in a rotation direction about the Z axis, for the purpose of camera-shake correction. The camera system 10 of this embodiment holds the image pickup device 117 via the image pickup device moving mechanism 159, to thereby allow the image pickup device 117 to mechanically move in the X-axis direction, the Y-axis direction, and in the rotation direction about the Z axis.

Further, the image pickup device moving mechanism 159 is also configured to allow the image pickup device 117 to be movable in the Z-axis direction, which corresponds to the optical axis direction. The driving apparatus 300 for camera shake correction according to the present invention is configured to use, as a drive source, an X-axis actuator, Y-axis actuator 164, and a transducer 165, for moving a movable frame (holder) 145 having an image pickup unit 116 including the image pickup device 117 mounted thereon.

Specifically, the image pickup device moving mechanism 159 is configured by including an X-axis gyroscope 160, a Y-axis gyroscope 161, a Z-axis rotation detector 170, a shake correction control circuit 162, the X-axis actuator 163, the Y-axis actuator 164, the transducer 165, a holder (second member) as the movable frame, a frame 167 (first member) as the fixed frame, a position detection sensor 168, and an actuator drive circuit 169. Here, the shake detector is configured by including the X-axis gyroscope 160, the Y-axis gyroscope 161, and the Z-axis rotation detector 170. It is needless to say that an acceleration sensor in the Z-axis direction may be provided to detect camera shake in the Z-axis direction, so as to move the image pickup device 117 in the Z-axis direction.

Figure 2:
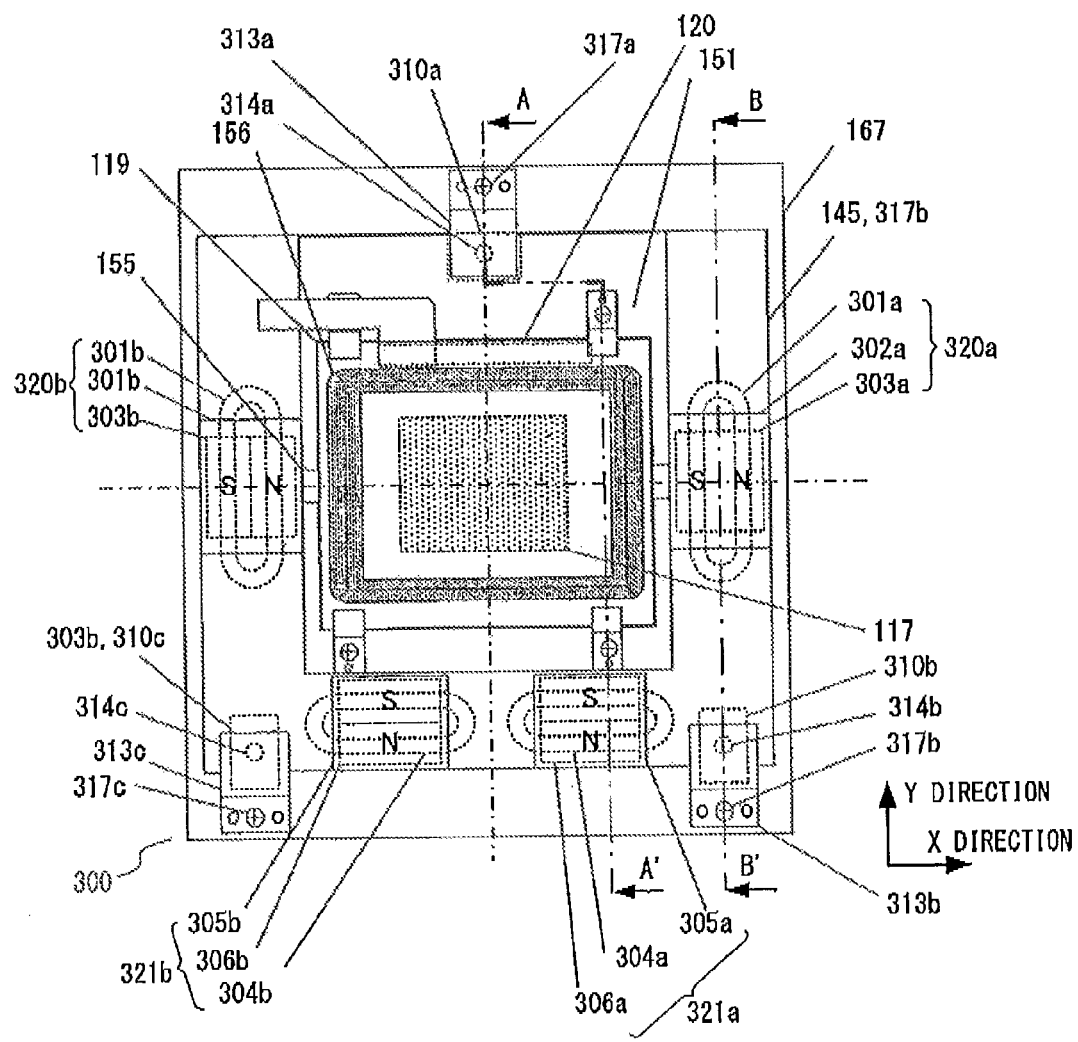
FIG. 2 is a schematic front view illustrating the driving apparatus in a simplified manner.
Figure 3:
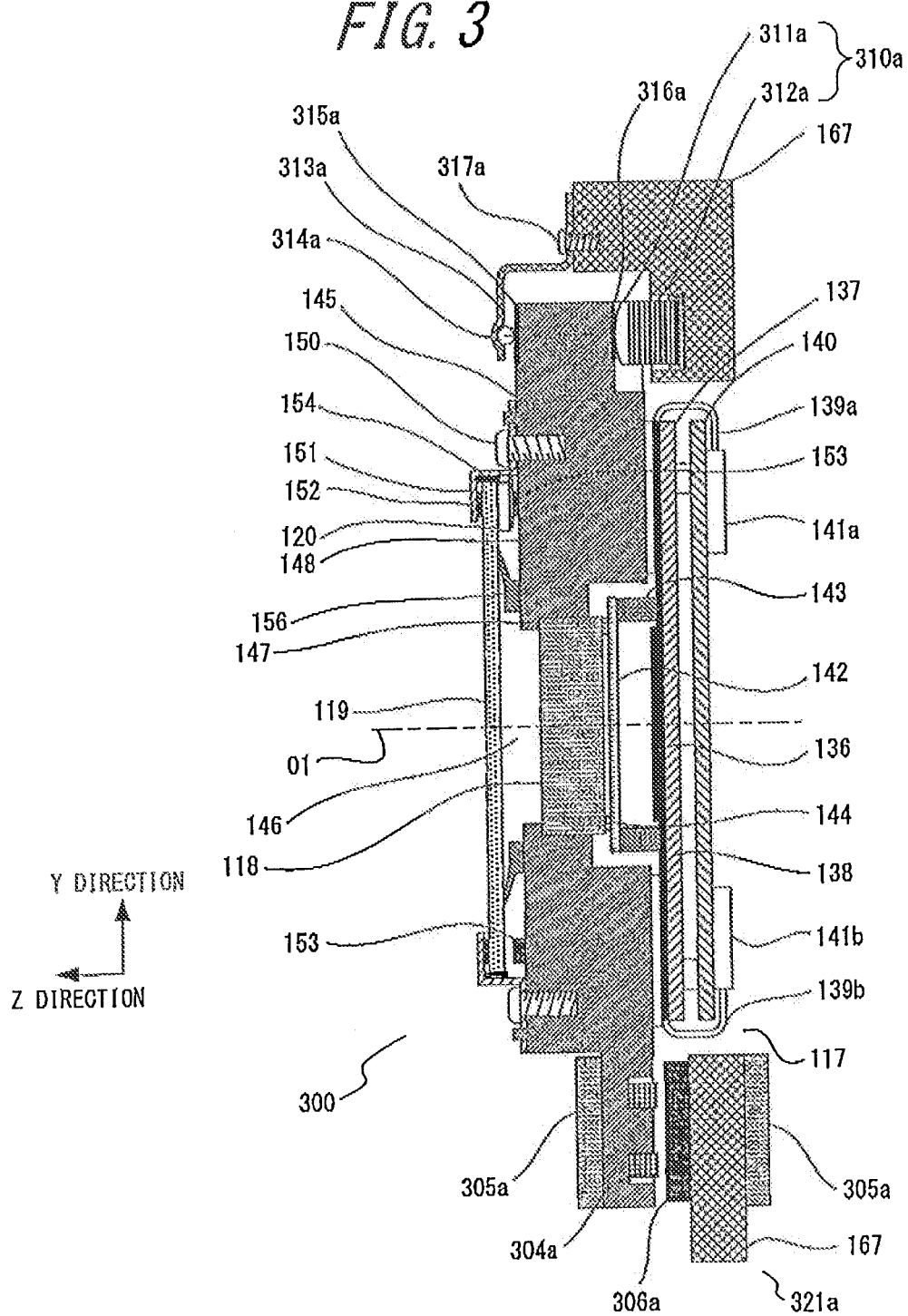
FIG. 3 is a longitudinal side view (sectional view taken along the line A-A') of a main part of the driving apparatus of FIG. 2.
Figure 4:
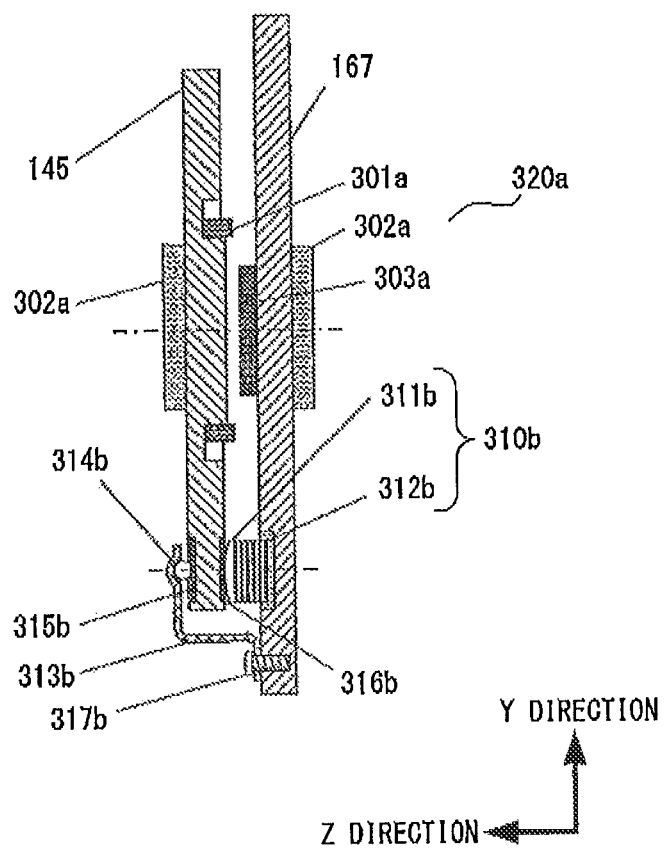
FIG. 4 is a longitudinal side view (sectional view taken along the line B-B') of a main part of the driving apparatus of FIG. 2.

Next, referring to FIGS. 2 to 5, description is given of a driving apparatus 300 of this embodiment which employs, as a drive source, an electromagnetic VCM (first driving mechanism) and a transducer (second driving mechanism) having a piezoelectric body. FIG. 2 is a schematic front view illustrating a configuration example of the driving apparatus of this embodiment, and FIG. 3 is a sectional side view of the driving apparatus taken along the line A-A' of FIG. 2 and viewed from the side. FIG. 4 is a sectional side view of the driving apparatus taken along the line B-B' of FIG. 2 and viewed from the side. FIG. 5A is a front view illustrating a schematic configuration of VCM, and FIG. 5B is a sectional side view taken along the line C-C' of FIG. 5A and viewed from the side. The front view of FIG. 5A shows the VCM viewed from the movable frame side, excluding the yoke and the movable frame.

The frame 167 (first member) as a fixed frame is fixed to the body unit 100. The holder 145 (second member) as a movable frame for holding the image pickup device 117 is supported by the frame 167 so as to be movable in the X-direction, in the Y-direction, and in the rotation direction about the Z-axis. The holder 145 is supported in such a manner that three transducers 310a to 310c (second driving mechanism) abut to slide plates B 316a to 316c (slide plate B 316c is not shown) disposed on one side of the holder 145, the slide plates A 315a to 314c disposed at a position opposing to the slide plates B 316a to 315c of the holder 145 abut to balls 314a to 314c, and holddown springs 313a to 313c forming leaf springs press the holder 145 against the transducers 310a to 310c in the Z-axis direction via the balls 314a to 314c. The balls 314a to 314c are configured to be rollable and slidable relative to the slide plates A 315a to 315c (slide plate A 315c is not shown). Then, the transducers 310a to 310c includes piezoelectric bodies 312a to 312c and contact bodies (contact portions) 311a to 311c, the piezoelectric bodies 312a to 312c each being in a columnar shape having one end fixed to the frame 167, the contact bodies 311a to 311c each being adhered to another end of each of the piezoelectric bodies and having an spherical end portion. With this configuration, the holder 145 is held by a plane formed by three points where the three contact bodies 311a to 311c contact with the slide plates B 316a to 316c of the holder 145, so as to be movable freely in a direction along the plane (also referred to as in-XY plane direction). At this time, the position of the holder 145 in the Z-axis direction, that is, the pressing direction, comes in line with a position of a plane (support plane) formed by the three points at which the three contact bodies 311a to 311c contact with the slide plates B 316a to 316c of the holder 145. This plane (XY plane) is parallel to the X axis and the Y axis. When the transducers 310a to 310c are not vibrating, the holder 145 is held by the frame 167 through a frictional force between the contact bodies 311a to 311c and the slide plates B 316a to 316c. On the other hand, when the transducers 310a to 310c receives vibrations of high frequencies, the frictional force is reduced as described later so that the holding is released, thereby making it possible to drive the VCM to move the holder 146 in the X-axis direction and in the Y-axis direction, and to rotate about the Z-axis direction.

Figure 5:
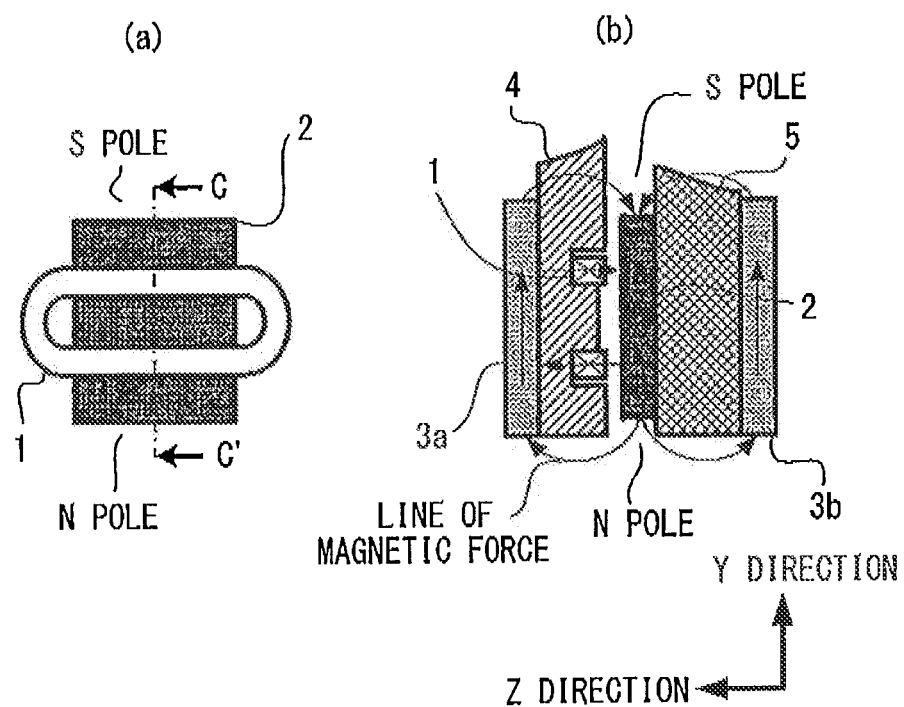
FIG. 5A is a partial front view illustrating a configuration of a main part of a general voice coil motor (VCM)
FIG. 5B is a partial longitudinal side view (sectional view taken along the line C-C') illustrating the configuration of the main part of the general voice coil motor (VCM)

Here, referring to FIG. 5, description is given of a general configuration of the VCM (first driving mechanism) as an actuator for driving the holder 145 in the in-XY plane direction. FIG. 5A is a front view illustrating a general VCM viewed from the movable frame side, excluding the yoke and the movable frame on the movable frame side. FIG. 5B is a sectional side view taken along the line C-C' of FIG. 5A. A coil 1 formed of a pre-insulated conductive thin line wound in a track form is fixed to the movable frame 4 by means of adhesion or the like. A magnet 2 in a plate shape is magnetized in the Y-axis direction so as to have the north (N) pole on the lower side and the south (S) pole on the upper side in FIG. 5, and fixed to the fixed frame 5 by means of adhesion or the like. Further, yokes 3a and 3b each formed of a magnetic material in a plate shape are fixed by means of adhesion or the like, across the magnet 2 and the coil 1, to the movable frame 4 and the fixed frame 5, respectively, to thereby form a magnetic circuit so as to prevent the lines of magnetic force, which is generated by a current flow in the magnet 2 or in the coil 1, from leaking outside. In this state, when a current is passed through the coil 1, opposite currents flow perpendicularly to the opposite lines of magnetic force of the magnet 2, acting a force in a direction perpendicular to the magnetic lines of force and the current, to thereby drive the movable frame 4 in the Y-axis direction. When the current is passed in the reverse direction, the movable frame 4 is driven in the reverse direction. The force to be generated may be varied depending on the magnitude of current flowing in the coil 1. Here, the yokes 3a and 3b may be eliminated when the movable frame 4 and the fixed frame 5 are each formed of a magnetic material.

Next, referring to FIGS. 2, 3, and 4, the drive operation of the driving apparatus 300 is described. The driving apparatus 300 includes a VCM-XA 320a, a VCM-XB 320b, a VCM-YA 321a, a VCM-YB 321b, each being configured similarly to the VCM of FIG. 5, which are arranged as illustrated in FIG. 2. The VCM-XA 320a and the VCM-XB 320b are VCMs for generating a drive force in the X-axis direction, constituting the X-axis actuator 163 of FIG. 1. The VCM-YA 321a and the VCM-YB 321b are VCMs for generating a drive force in the Y-axis direction, constituting the Y-axis actuator 164 of FIG. 1. Further, the VCM-YA 321a and the VCM-YB 321b may be applied with different drive forces (drive forces in the opposite directions depending on the case) so as to generate a drive force in the rotation direction about the Z-axis. When driving the VCM in this manner, the transducers 310a to 310c (transducer 165 of FIG. 1) are applied with vibration, so as to reduce the frictional force at the contact portions between the contact bodies 311a to 311c and the slide plates B 316a to 316c.

The position control on the holder 145 is performed by the position detection sensor 168 and the actuator drive circuit 169, the position detection sensor 168 detecting the position of the holder 145 in the X-axis direction, the Y-axis direction, and the Z-axis direction, and the rotation direction about the Z-axis, the actuator drive circuit 169 controlling the operations of the VCM-XA 320a, the VCM-XB 320b, the VCM-YA 321a, the VCM-YB 321b, and the transducers 310a to 310c.

Next, description is given of an operation of the image pickup device moving mechanism 159 including the driving apparatus 300 described above. The X-axis gyroscope 160 detects the angular velocity of a rotation of the camera system 10 about the X axis, the Y-axis gyroscope 161 detects the angular velocity of a rotation of the camera system 10 about the Y axis, the Z-axis rotation detector 170 detects the angular velocity of a rotation of the camera system 10 in the XY plane and the position of the rotation center. The shake correction control circuit 162 calculates, based on the angular velocity and the position of the rotation center of the camera system 10 thus detected, a camera shake correction amount, and causes the driving apparatus 300 to move the image pickup device 117 to be displaced so as to correct the camera shake. Although this embodiment employs a VCM as an actuator for moving the image pickup device 117 in the image pickup device moving mechanism 159, the present invention is not limited thereto, and may employ, instead, a rotary motor, a linear motor, an ultrasonic motor, and the like.

The image pickup device moving mechanism 159 configured as described above moves the image pickup device 117 in accordance with the movement of the camera system 10 to thereby attain a function of suppressing a shake of an object image in the image pickup device 117 resulting from the movement of the camera system 10, which is so-called an image sensor shift type image stabilization function. The driving apparatus 300, which is applied to the image sensor shift type image stabilization in this embodiment, may also be applied by all means to lens shift type image stabilization in which the imaging lens side is moved by the driving apparatus of the present invention to perform camera shake correction.

Next, referring to FIGS. 6 to 9, description is given of friction reduction at the contact portion of the contact body 311 and the driving of the holder 145 in the Z-axis direction in this embodiment.

Figure 6:
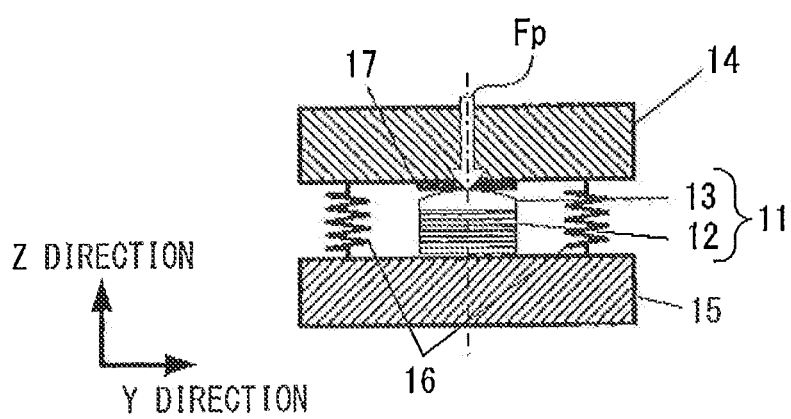
FIG. 6 is a partial sectional view schematically illustrating a configuration of a main part of a transducer.

FIG. 6 is a partial sectional view schematically illustrating a configuration of a main part of a transducer. As illustrated in FIG. 6, a fixed frame 15 is provided with a transducer 11 (corresponding to each of the transducer 165 of FIG. 1 and the transducers 310a, 310b, and 310c of FIGS. 2 to 4), and a slide plate 17 (corresponding to each of the slide plates B 310a to 316c of FIGS. 3 and 4) adhered to a movable frame 14 (corresponding to the holder 145 of FIGS. 1 to 4) is pressed against a spherical convex portion of a contact body 13 (corresponding to each of the contact bodies 311a, 311b, and 311c of FIGS. 3 and 4) adhered to an end portion of a piezoelectric body 12 (corresponding to each of the piezoelectric bodies 312a, 312b, and 312c of FIGS. 3 and 4) of the transducer 11.

The pressing force between the slide plate 17 and the contact body 13 is generated by a spring 16 disposed between the fixed frame 15 and the movable frame 14. The pressing force may be generated by any mechanism, including a coil spring as shown in FIG. 6, a leaf spring, or a magnetic force generated by a magnet, as long as the mechanism is capable of generating a pressure between the contact body 13 and the slide plate 17. The embodiment illustrated in FIGS. 2 to 4 uses the holddown springs 313a, 313b, and 313c to generate the pressing force.

FIGS. 9A to 9G are views schematically illustrating an operation of the main configuration of FIG. 6, for illustrating a friction reduction between the movable frame and the contact body. FIGS. 9A to 9G show the movable frame 14 and the transducer 11 at predetermined time intervals, when the piezoelectric body 12 of FIG. 6 is vibrated through application of a frequency voltage. FIG. 10 shows a voltage signal applied to the piezoelectric body 11 corresponding the times from T0 to T6 of FIG. 9.

Figure 9:
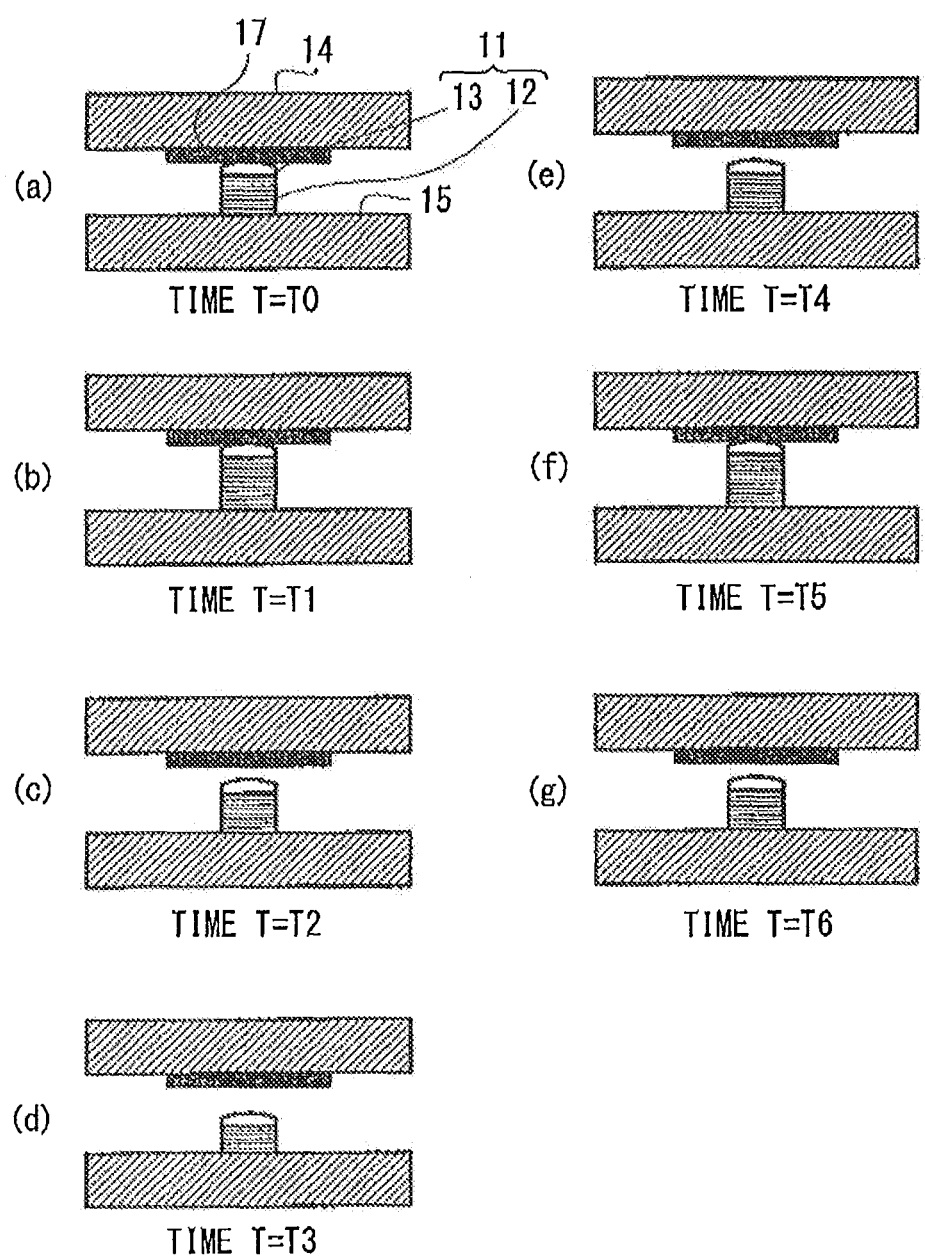
FIGS. 9A and 9B are views schematically illustrating an operation of the main configuration of FIG. 6, for illustrating a friction reduction between a movable frame and a contact body.
Figure 10:
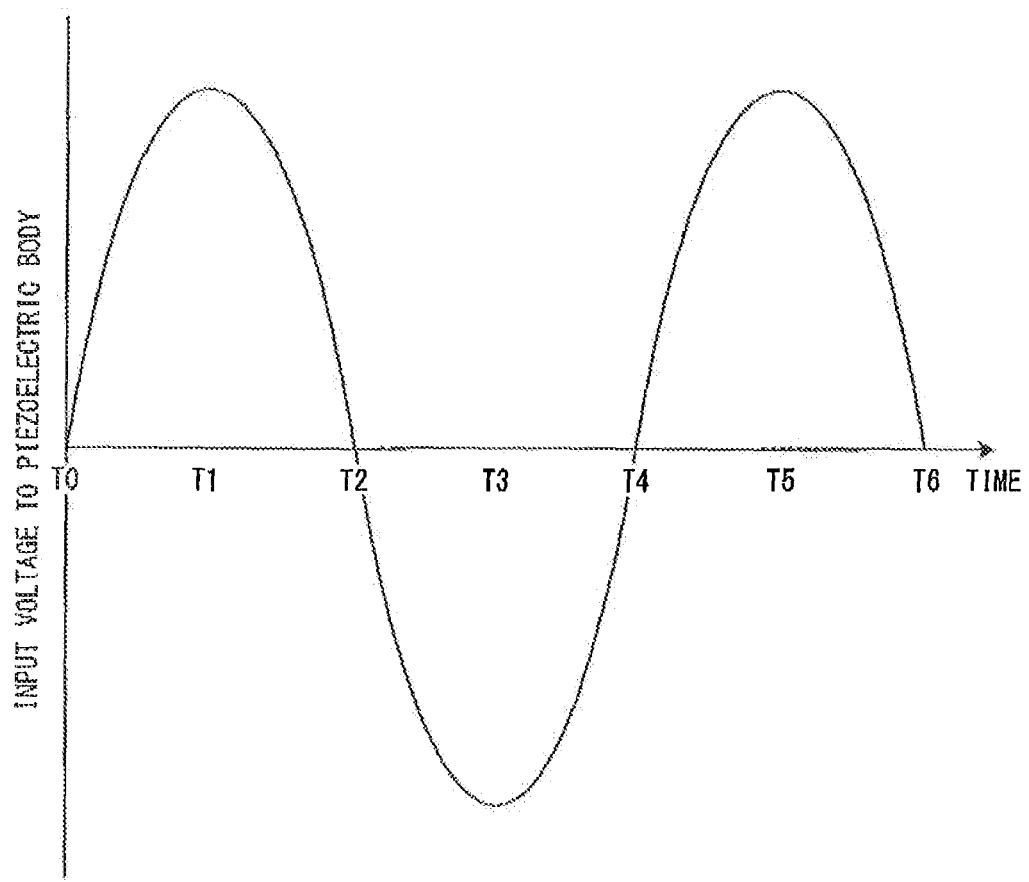
FIG. 10 is a graph showing an input signal input to the piezoelectric body, for illustrating a friction reduction between the movable frame and the contact body.

When a sinusoidal-wave voltage of 20 kHz or higher is applied to the piezoelectric body 12 so as to generate a ultrasonic vibration with an amplitude of about 1 μm in a contact surface between the contact body and the slide plate 17 of the movable frame 14, the contact body 13 hardly contacts with the slide plate 17 as illustrated in FIG. 9. To be more specific, in the initial state illustrated in FIG. 9A where no voltage is applied to the piezoelectric body 12, the contact body 13 is pressed against to be in contact with the slide plate 17, under the pressing force of the spring 16.

Next, when a voltage is applied to the piezoelectric body 12 so as to allow the piezoelectric body 12 to extend, the contact body 13 is pressed against the slide plate 17 as being applied with an additional force obtained as a product of the acceleration of the displacement of the piezoelectric body and the mass of the movable frame 14. The acceleration of the displacement gradually reduces to zero, and the piezoelectric body 12 is extended to its maximum length as being applied with a maximum voltage (FIG. 9B). The contact body 13 may not come into contact with the slide plate 17 in this state depending on the conditions, if the acceleration initially applied is extremely large.

The piezoelectric body 12 starts to contract, after being deformed to its maximum, and returns to the initial state. At this time, the displacement caused by the acceleration generated by the piezoelectric body cannot be restored sufficiently by the spring 16 (the piezoelectric body is small in time constant whereas the spring 16 is relatively very large in time constant, resulting in response delay), which realizes a state where the contact body 13 is not in contact with the slide plate 17 (FIG. 9C).

The piezoelectric body 12 is then applied with a maximum voltage in a direction of contracting the piezoelectric body 12, with the contact body 13 remaining not in contact with the slide plate 17 (FIG. 9D).

Next, the voltage applied to the piezoelectric body 12 is reduced to zero, and the piezoelectric body 12 returns to the displacement of the initial state. However, the contact body 13 does not contact with the slide plate 17 (FIG. 9E).

Further, the piezoelectric body 12 is applied with a voltage in an extending direction. Along with the extension of the piezoelectric body 12, the contact body 13 comes into contact with the slide plate 17, with the movable frame 14 being applied with acceleration in a direction away from the contact body 13 (FIG. 9F).

When the piezoelectric body 12 is applied with a voltage in a contracting direction again and the piezoelectric body 12 returns to the displacement of the initial state, the contact body 13 and the slide plate 17 are brought into a non-contact state again (FIG. 9G). As illustrated above, the operation is repeated with a cycle of FIGS. 9C to 9G. FIGS. 9A to 9C are transient states from the static state to the generation of constant vibration, and hence the process from FIGS. 9C to 9G is repeated in the constant vibration state.

In one cycle from FIGS. 9C to 9G, the contact body 13 and the slide plate 17 are not in contact with each other (in the non-contact state) for most of the time in the one cycle, during which the frictional force Ff becomes zero, except only when the contact body 13 is brought into contact with the slide plate 17 for around the moment of FIG. 9F. Therefore, the average frictional force Ff for one cycle becomes extremely small. In reality, the VCM can be operated with the frictional force Ff of zero in the non-contact state, while being subjected to a brake force due to a momentary frictional force in accordance with the period of vibration of the piezoelectric body 12. However, the period of vibration is significantly small enough to allow the VCM to smoothly operate as if the frictional force is constantly small. As understood from this operation, the piezoelectric body 12 can be changed in vibration amplitude, to thereby vary the contact time between the contact body 13 and the slide plate 17. When the vibration amplitude is reduced to extremely small (the amplitude is set to a value close to zero), the state of the contact body 13 and the slide plate 17 is hardly different from the state of being in constant contact with each other, and the frictional force Ff is obtained as Ff≈μFp. Here, μ represents a frictional coefficient of the contact surface between the contact body 13 and the slide plate 17, and Fp represents a pressing force of the spring 16.

Here, when the piezoelectric body 12 is vibrated, the contact body 13 is applied with acceleration at a level of several tens of thousands of m/s$^2$ due to the ultrasonic vibration. Therefore, the contact body 13 may preferably be formed of metal or ceramics that are high in rigidity, and more preferably be formed of a mixture of a highly-rigid resin such as PPS and a material such as ceramic powder, glass fiber, or carbon fiber, for the purpose of suppressing audible noise. Further, the contact body 13 may be cemented to the piezoelectric body 12 by means of an epoxy adhesive which is high in rigidity. On the other hand, the slide plate 17 that comes into contact with the contact body 13 may preferably be formed of metal or ceramics that are high in rigidity and abrasion-resistant, and more preferably be formed of non-magnetic stainless or the like, because a magnet of the VCM is disposed in the vicinity thereof in this embodiment.

Figure 7:
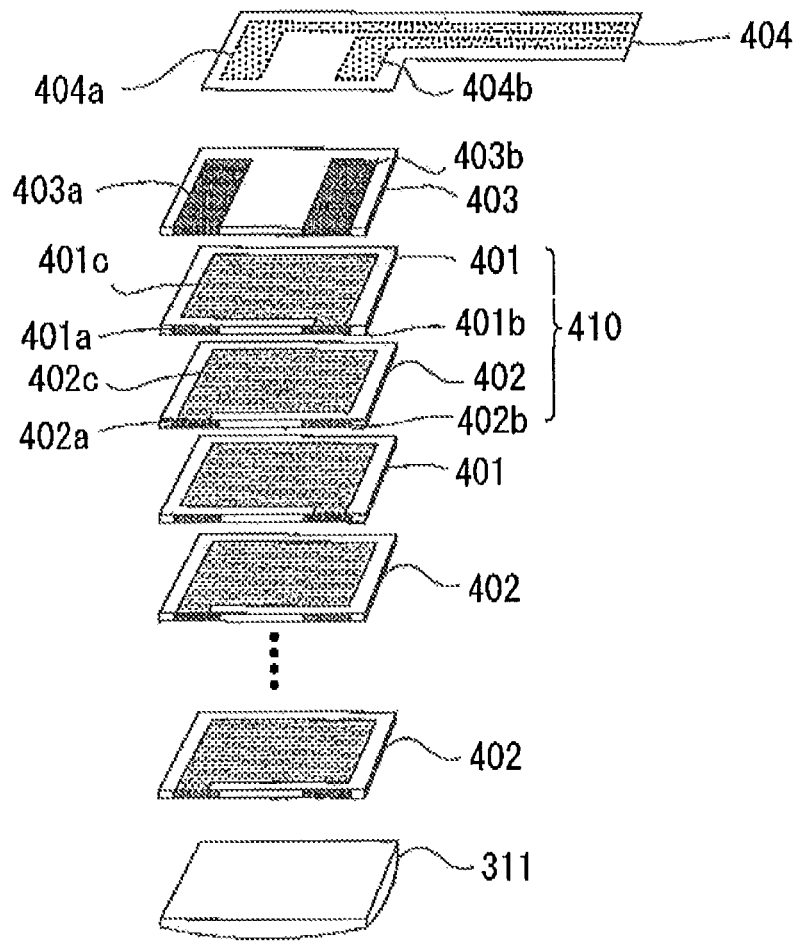
FIG. 7 is an exploded perspective view illustrating a configuration of a main part of a piezoelectric body.
Figure 8:
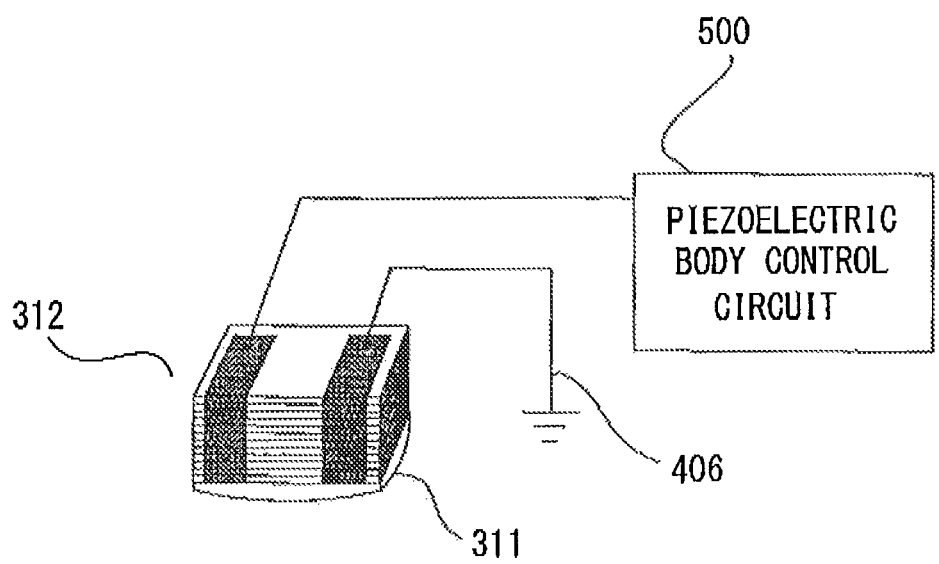
FIG. 8 is a diagram for illustrating a configuration of a piezoelectric body and a control circuit of the piezoelectric body.

FIGS. 7 and 8 each illustrate a configuration of the piezoelectric bodies 312a, 312b, and 312c, each forming the transducers 310a, 310b, and 310c, respectively. FIG. 7 is an exploded perspective view illustrating in detail either one of the piezoelectric bodies 312a, 312b, or 312c. The piezoelectric bodies 312a, 312b, and 312c are each formed of a multilayer piezoelectric body including a number of piezoelectric single plates formed of piezoelectric ceramics such as lead zirconate titnate, which are stacked on top of another. The piezoelectric bodies to be stacked have a basic configuration 410 which includes a pair of a piezoelectric plate A 401 in a rectangular plate shape and a piezoelectric plate B 402 in a rectangular plate shape, the piezoelectric plate A 401 having an electrode C 401c serving as an internal electrode formed on a surface on one side, the piezoelectric plate B 402 having an electrode C 402c serving as an internal electrode formed on a surface on one side. These piezoelectric plates are laminated in a plurality of pairs to thereby form the multilayer piezoelectric body. The electrodes C 401c and 402c are taken out to different side positions, the piezoelectric plate A 401 and the piezoelectric plate B 402 are laminated, and the piezoelectric plate C 403 without having an internal electrode is further laminated thereon. The multilayer piezoelectric body thus formed is then baked, and has an electrode A 401a and an electrode B 401b formed on the side thereof, to thereby allow an internal electrode to be connected alternately to the piezoelectric plate A 401 and to the piezoelectric body B 402, so that two electrodes, namely, an electrode A 403a and an electrode B 403b are formed on a surface of the piezoelectric plate C 403 as an outermost surface. Although FIG. 7 shows a lamination of a plurality of piezoelectric single-plates, the same configuration can also be attained by folding a piezoelectric single-plate.

When the multilayer piezoelectric body thus formed is applied with a high voltage between the electrode A and the electrode B, the piezoelectric plates A 401 and the piezoelectric plates B 402 are polarized in the same direction in the plate thickness direction. Therefore, as illustrated in FIG. 8, when a frequency voltage is applied with one electrode 406 of the electrodes A and B being connected to the ground while the other one of the electrodes A and B being connected to a signal output terminal of a piezoelectric body control circuit 500, the piezoelectric bodies 312a, 312b, and 312c each extend or contract in the plate thickness direction.

Figure 11:
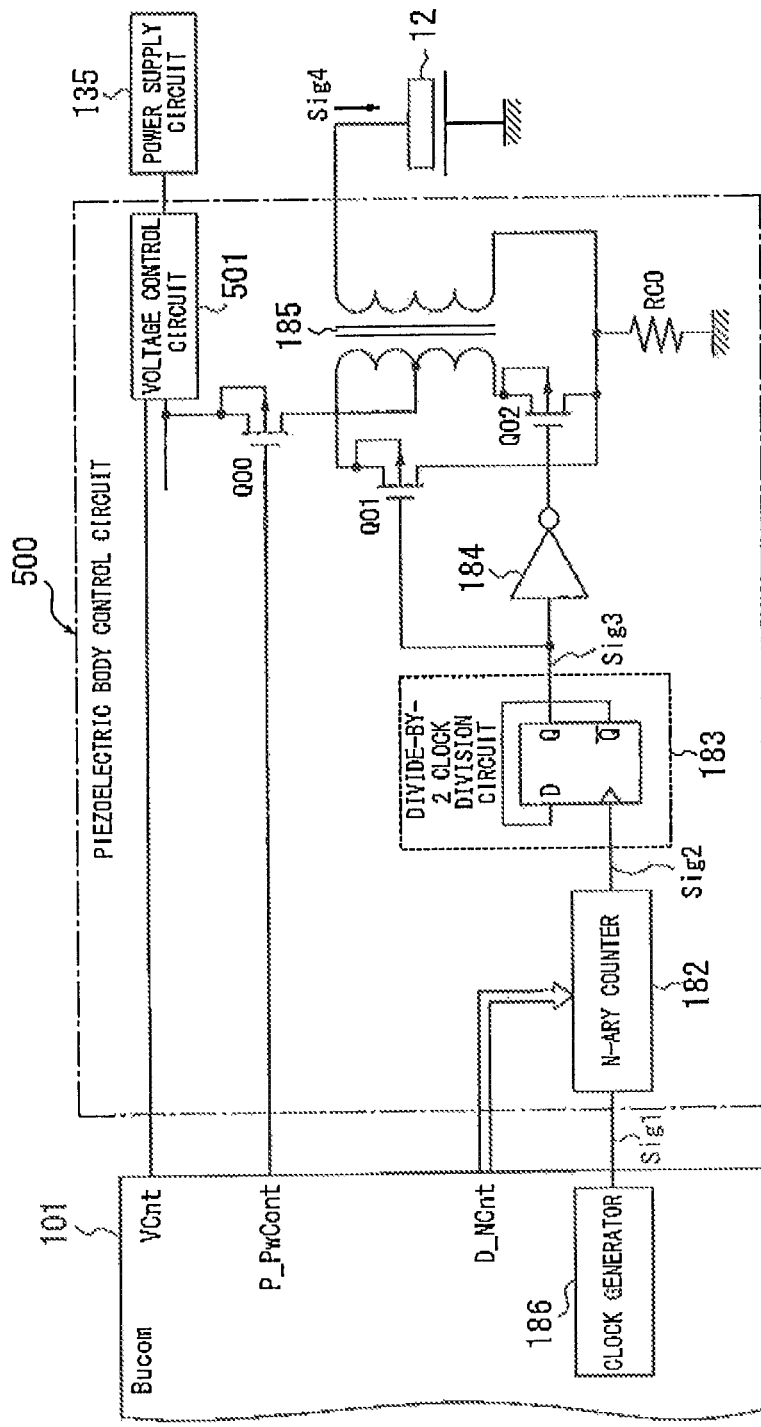
FIG. 11 is a diagram illustrating a control circuit for controlling a piezoelectric body.
Figure 12:
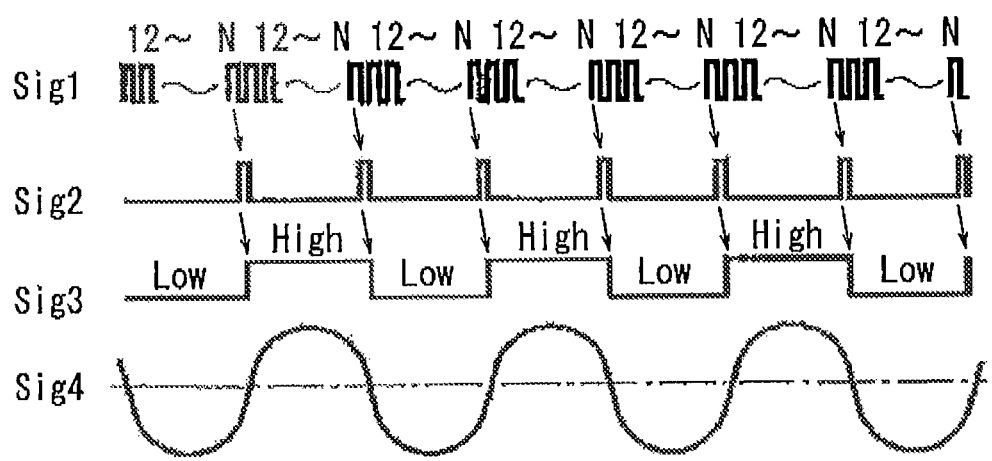
FIG. 12 is a time chart of signals of the control circuit of FIG. 11.

FIG. 11 is a circuit diagram schematically illustrating a configuration of the piezoelectric body control circuit 500 of the piezoelectric bodies 312a, 312b, and 312c in the driving apparatus 300. FIG. 12 is a time chart showing waveforms of signals Sig1 to Sig4 output from the respective components in the piezoelectric control circuit 500 of FIG. 11. Here, the piezoelectric body control circuit 500 constitutes part of the actuator drive circuit 169 of FIG. 1. As described above, when the piezoelectric body is configured as a multilayer piezoelectric body, the piezoelectric body can be driven at a lower voltage, to thereby further reduce the driving circuit in size.

The piezoelectric body control circuit 500 includes, as illustrated in FIG. 11, an N-ary counter 182, a divide-by-2 clock division circuit 183, an inverter 184, a plurality of MOS transistors Q00, Q01, Q02, a transformer 185, and a resistor R00.

The circuit is configured in such a manner that the ON/OFF switching operation of the MOS transistor Q01 and the MOS transistor Q02 connected to the primary of the transformer 185 generates a signal (Sig4) of a predetermined cycle on the secondary side of the transformer 185. The piezoelectric bodies 312a, 312b, and 312c are driven based on the signal of a predetermined cycle, so as to generate vibrations as illustrated in FIG. 9.

The Bucom 101 controls the piezoelectric body control circuit 500 as follows, by means of two IO ports, namely, an IO port P_PwCont and an IO port D_NCnt provided as control ports, and a clock generator 186 disposed inside the Bucom 101. The clock generator 186 outputs a pulse signal (basic clock signal) to the N-ary counter 182 at a frequency that is sufficiently higher than the frequency of signals to be applied to the piezoelectric bodies 312a, 312b, and 312c. The output signal corresponds to the signal Sig1 having a waveform shown in the time chart of FIG. 12. The basic clock signal is then input to the N-ary counter 182.

The N-ary counter 182 counts the pulse signal and outputs a count end pulse signal each time a predetermined value "N" is reached. In other words, the basic clock signal is frequency-divided into 1/N. The signal thus output corresponds to the signal Sig2 having a waveform shown in the time chart of FIG. 12.

The duty ratio of High and Low levels of the pulse signal thus frequency-divided is not 1:1. Therefore, the pulse signal is passed through the divide-by-2 clock division circuit 183 so as to have the duty ratio converted to 1:1. The pulse signal thus converted corresponds to the signal Sig3 having a waveform shown in the time chart of FIG. 12.

In the High state of the converted pulse signal, the MOS transistor Q01 receiving the signal input thereto is turned ON. On the other hand, this pulse signal applied to the MOS transistor Q02 via the inverter 184. Therefore, in the Low state of the pulse signal, the MOS transistor Q02 receiving the signal input thereto is turned ON. When the MOS transistor Q01 and the MOS transistor Q02 connected to the primary of the transformer 185 are alternately turned ON, a signal having a cycle like the signal Sig4 of FIG. 12 on the secondary side.

The winding ratio of the transformer 185 is defined based on the output voltage of the voltage control circuit 501 and the voltage necessary for driving the piezoelectric bodies 312a, 312b, and 312c. The resistance R00 is provided so as to prevent an excessive current from flowing through the transformer 185. Further, the output voltage of the power supply circuit 135 is input to the voltage control circuit 501.

Figure 13:
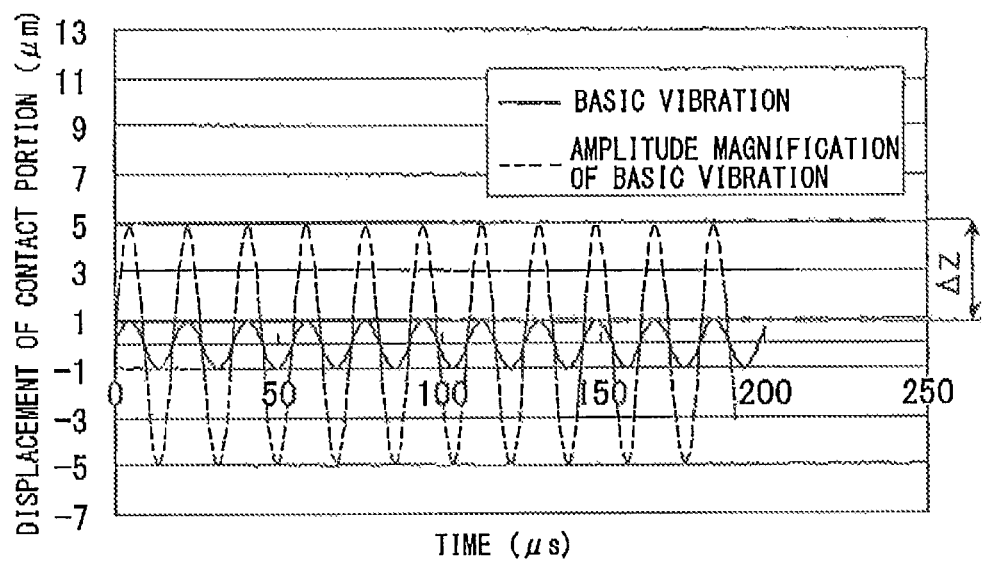
FIG. 13 is a graph illustrating a displacement in the Z-axis direction caused by a transducer.

The output voltage of the voltage control circuit 501 is set based on VCnt of the Bucom 101, which defines a voltage to be applied to the piezoelectric bodies 312a, 312b, and 312c. The output voltage of the voltage control circuit 501 defines the vibration amplitude of the piezoelectric bodies 312a, 312b, and 312c. FIG. 13 is a graph showing specific vibration amplitudes changed by the voltage control circuit 501. In this case, the contact position in the Z-axis direction between each of the contact bodies 311a, 311b, and 311c and the slide plates of the holder 145 changes along with the magnification of the amplitude relative to a reference amplitude. The change ΔZ in the contact position at this time is 4 μm. In this manner, by controlling a voltage to be applied to the piezoelectric bodies 312a, 312b, and 312c, the position of the holder 145 in the Z-axis direction can also be controlled. In FIG. 13, the change ΔZ associated with the reference vibration is 1 μm, relative to the case of not vibrating the piezoelectric body. However, the value can be corrected if stored in the non-volatile memory 128.

In driving the piezoelectric bodies 312a, 312b, and 312c, the MOS transistor Q00 must be in the ON state and a voltage must be applied to a center tap of the transformer 185 from the voltage control circuit 501. In this case, the ON/OFF control of the MOS transistor Q00 is performed via the IO port P_PwCont of the Bucom 101. The N-ary counter 182 has a set value "N" which can be set through the IO port D_NCnt of the Bucom 101. Thus, the Bucom 101 can control the set value "N" as appropriate, to thereby arbitrarily change the drive frequency of the piezoelectric bodies 312a, 312b, and 312c. Further, the resonance frequency of the transducers 310a, 310b, and 310c may be set as the drive frequency, and the vibration amplitude of the transducers 310a, 310b, and 310c may be magnified so as to operate at a low voltage. When the resonance frequency is set as the drive frequency, control is necessary to detect the vibration state of the piezoelectric bodies 312a, 312b, and 312c so as to follow the resonance frequency. The vibration state can be detected by, for example, detecting a current input to the piezoelectric bodies 312a, 312b, and 312c.

At this time, the frequency can be calculated based on the following Expression (1).

$$fdrv = fpls/2N \qquad (1),$$

where N represents a value set to the N-ary counter 182, fpls represents a frequency of the output pulse from the clock generator 186, and fdrv represents the frequency of a signal to be applied to each of the piezoelectric bodies 312a, 312b, and 312c. Here, the arithmetic operation based on Expression (1) is performed in the CPU (control unit) of the Bucom 101.

Further, fdrv may preferably be set to a frequency of 20 kHz or larger in this embodiment. The piezoelectric bodies 312a, 312b, and 312c are vibrated at the frequency of fdrv, which is in the ultrasonic range and not audible to humans. The camera system 10 is required to be small in drive noise when used for recording sound along with a moving image. No sound in the ultrasonic range can be detected by an ordinary microphone because such sound is out of the audible range of humans.

Figure 14:
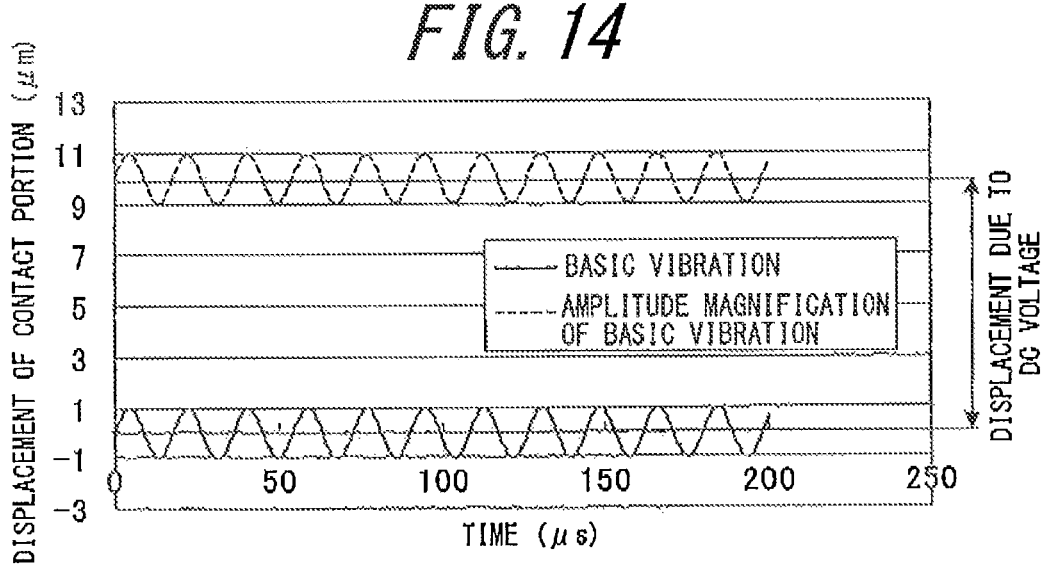
FIG. 14 is a graph illustrating a displacement in the Z-axis direction caused by a transducer controlled differently from FIG. 13.

Instead of changing the vibration frequency of the voltage to be applied to the piezoelectric body 312, a direct current voltage component can be applied. FIG. 14 shows vibrations of the piezoelectric bodies 312a, 312b, and 312c controlled by different piezoelectric body control circuits (not shown). The voltage control circuit 501 is eliminated from FIG. 11, and the output of the power supply circuit 135 is directly input so that the output from the direct current voltage circuit added with the output (DC voltage) from the direct current voltage circuit can be applied to the piezoelectric bodies 312a, 312b, and 312c. With this configuration, the output voltage of the direct current voltage circuit can be controlled to thereby make it possible to control the contact position in the Z-axis direction between each of the contact bodies 311a, 311b, and 311c, and the slide plates of the holder 145. In this case, the holder 145 can be controlled to be moved in the Z-axis direction through the application of a DC voltage, without driving the VCM.

As described above, the camera system 10 according to this embodiment includes: the VCM-XA 320a, the VCM-XB 320b, the VCM-YA 321a, and the VCM-YB 321b for moving the holder (movable frame) 145 relative to the frame (fixed frame) 167 in a direction along a support plane (XY plane) formed by contact bodies 311a to 311c, the holder (movable frame) 145 having an image sensor placed thereon; and the transducers 310a to 310c for displacing the contact bodies 311a to 311c in the pressing direction (Z-axis direction) relative to the frame 167, in which the transducer 310 vibrates the contact body 311 in the pressing direction, to thereby reduce the frictional force between each of the contact bodies 311a to 311c and the slide plates B 316a to 316c of the holder 145, with the result that the image pickup device 117 can be moved to be displaced with a smaller drive force by the driving apparatus 300 for the purpose of shake correction. At this time, in addition to the driving in the support plane (XY plane), driving in the pressing direction (Z-axis direction) perpendicular to the support plane is also made possible with a simple configuration. Further, the camera system 10 is capable of stopping the transducers 310a to 310c in the case of not performing camera shake correction, so as to precisely hold the position thereof.

That is, according to this embodiment, only the frame 167 as a fixed frame and the holder 145 as a movable frame are needed to be employed in order to perform driving in the direction along the XY plane, which makes the configuration compact and easy to be mounted, as compared to a case of providing separate movable frames for driving in the X-axis direction and in the Y-axis direction, respectively, for independently driving in the X-axis direction and in the Y-axis direction.

Further, the driving apparatus 300 of the camera system 10 is capable of driving the image pickup device 117 even in the pressing direction (Z-axis direction), which is applicable to fine adjustment of the position of an image sensor in the optical axis direction.

<Modified Example>

Figure 15:
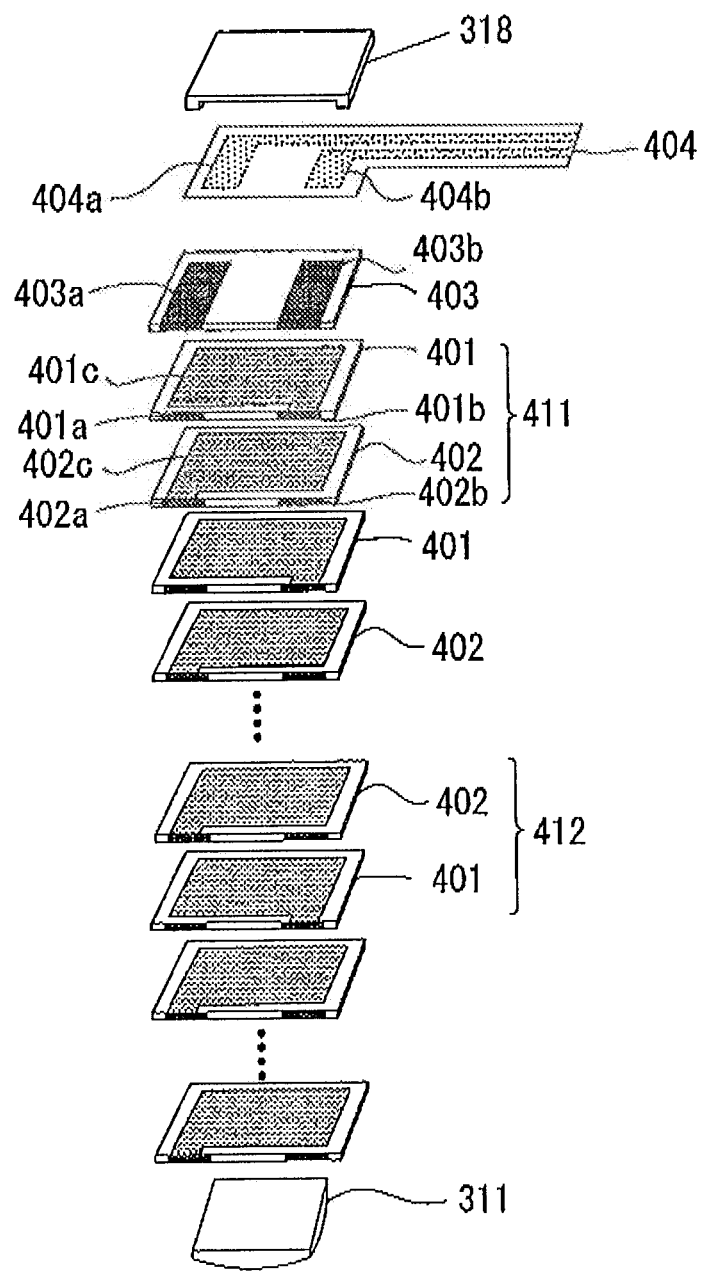
FIG. 15 is an exploded perspective view illustrating a configuration of a main part of a piezoelectric body according to a modified example.

The piezoelectric bodies 312a, 312b, and 312c of the first embodiment each may be configured as a multilayer piezoelectric body for generating flexing vibrations. The multilayer piezoelectric transducers for generating flexing vibrations are each configured by including, as illustrated in main part thereof in FIG. 15, a number of piezoelectric bodies each being in a rectangular plate shape, as in the first embodiment. However, the piezoelectric bodies of this example each have two basic configurations including a first basic configuration 411 and a second basic configuration 412, and therefore different from the piezoelectric bodies 312a, 312b, and 312c of the first embodiment.

Figure 16:
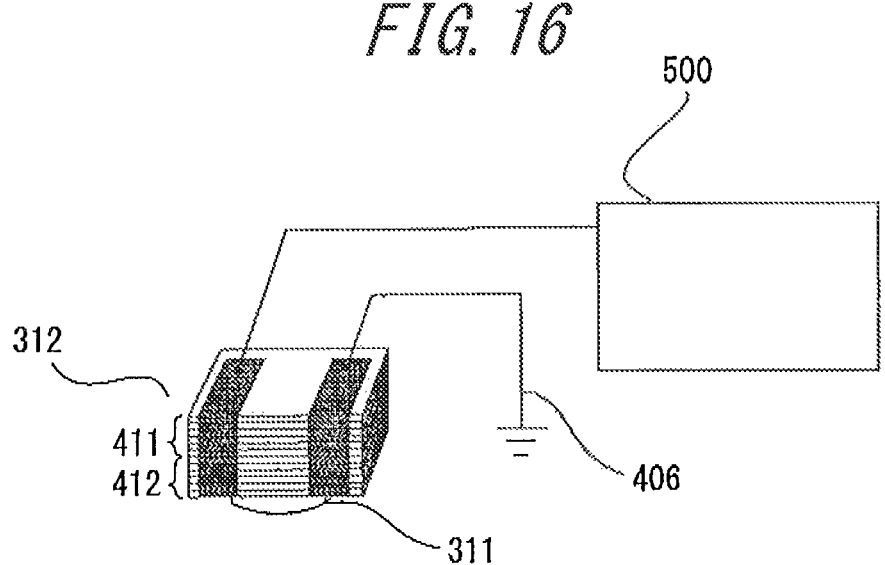
FIG. 16 is a diagram for illustrating a configuration of a piezoelectric body of the modified example and a control circuit for controlling the piezoelectric body.

The first basic configuration 411 includes a piezoelectric plate A 401 and a piezoelectric plate B 402 which are sequentially laminated in this order, similarly to the basic configuration 410 of the first embodiment. On the other hand, contrary to the first basic configuration 411, the piezoelectric plate B 402 and the piezoelectric plate A 401 of the second basic configuration 412 are sequentially laminated in this order. The piezoelectric body 312 includes, as illustrated in FIG. 16, the first basic configuration 411 and the second basic configuration 412 each including substantially the same number of piezoelectric plates, which are integrally formed as being stacked on top of another. The piezoelectric body 312 has one surface on the first basic configuration 411 side connected to a flexible board 404, and has the contact body 311 fixed to the center of an end surface on the second basic configuration 412 side by means of an adhesive or the like.

Figure 17:
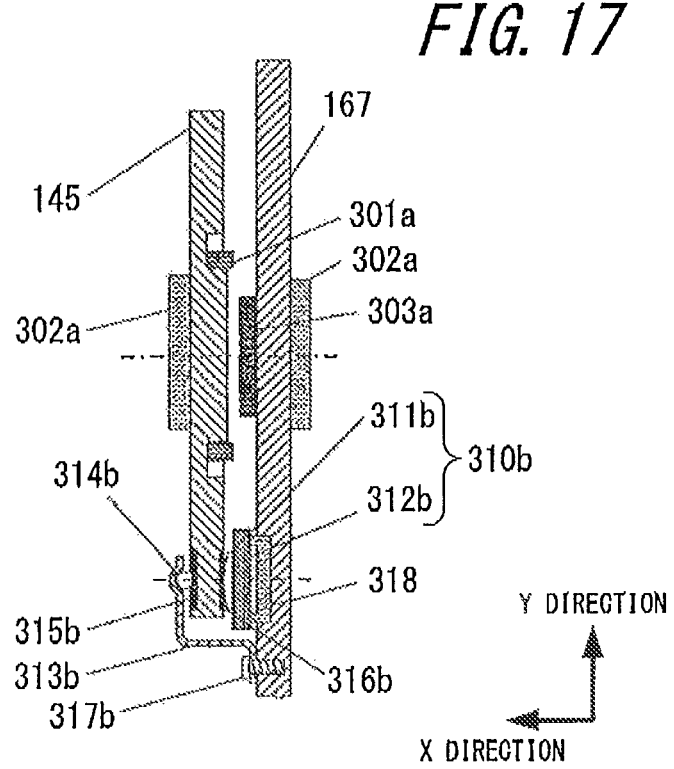
FIG. 17 is a longitudinal side view (sectional view taken along the line B-B') of the driving apparatus of FIG. 2 employing the piezoelectric body of the modified example.

Further, the piezoelectric body 312 has an end surface on the first basic configuration 411 side fixed to two protrusions on both ends of a support member 318, with the flexible board 404 in between, by means of an adhesive or the like, so as to be capable of performing bending vibration. Meanwhile, as illustrated in FIG. 17, the support member 318 has a main body in a rectangular shape fitted into a rectangular concave portion of the frame 167 so as to be fixed by means of an adhesive or the like, the main body being on a side different from where the protrusions are formed. The support member 318 may preferably be formed of a vibration damping material such as rubber or a resin, so as to prevent vibration from being transmitted to the frame. This modified example is similar to the first embodiment in other configurations.

In this state, when a sinusoidal-wave voltage is applied by the piezoelectric body control circuit 500 of FIG. 16, upon application of a positive voltage, a piezoelectric portion including the group of the first basic configuration 411 extends, for example, in the longitudinal direction of the rectangle while a piezoelectric portion including the second basic configuration contracts in the longitudinal direction of the rectangle. As a result, since the first basic configuration 411 and the second basic configuration 412 are integrally formed, the piezoelectric body bends in such a manner that a piezoelectric surface on the extending side is warped in a convex shape. Next, upon application of a negative voltage, the piezoelectric body bends to the other side opposite to the case of being applied with a positive voltage. Therefore, the contact body adhered to the piezoelectric body vibrates in the laminated direction of the piezoelectric body. This configuration has an advantage in that it allows the amplitude of the piezoelectric body to be further magnified.

<Second Embodiment>

A second embodiment of the present invention employs a configuration similar to that of the first embodiment. In the second embodiment, under the control of the Bucom 101, a contrast value in a predetermined region (focus area) is calculated for each of a plurality of images generated by the image processor 126 through vibration (wobbling operation) of the image pickup device 117 in the optical axis direction at a predetermined amplitude for the purpose of carrying out autofocusing by a so-called contrast detection method, to thereby detect whether the focus position is on the long distance side or the short distance side. Then, images are taken (photographed) while moving the focus lens 202 in a direction where the focal point is present by performing a wobbling operation, so that a maximum contrast state (focus point) can be detected from those images. The focus lens 202 is stopped at the focus point, to thereby carry out autofocusing.

Figure 18:
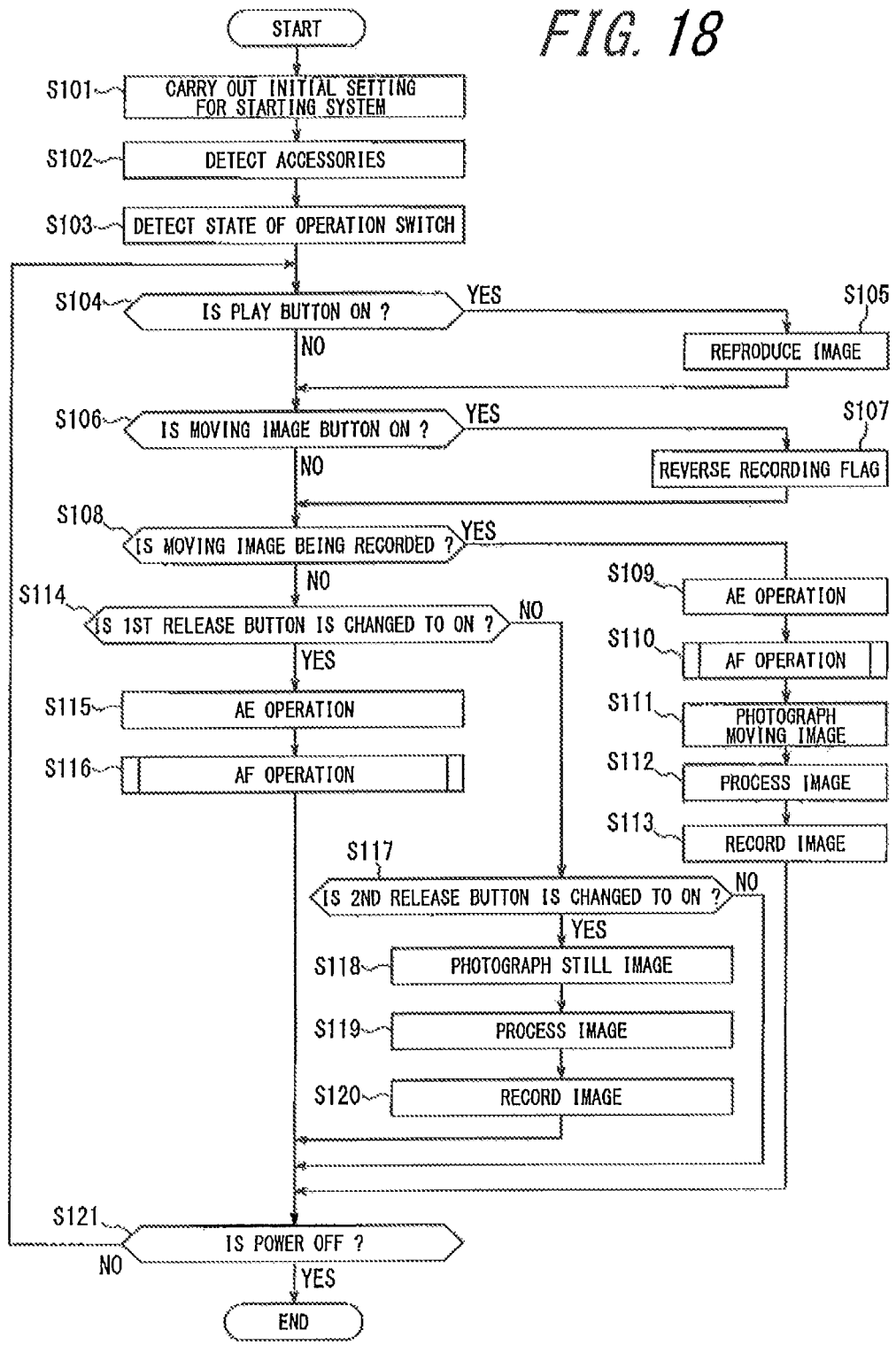
FIG. 18 is a flowchart for illustrating a basic operation of a camera in which the driving apparatus according to the second embodiment of the present invention is applied to automatic focusing.
Figure 19:
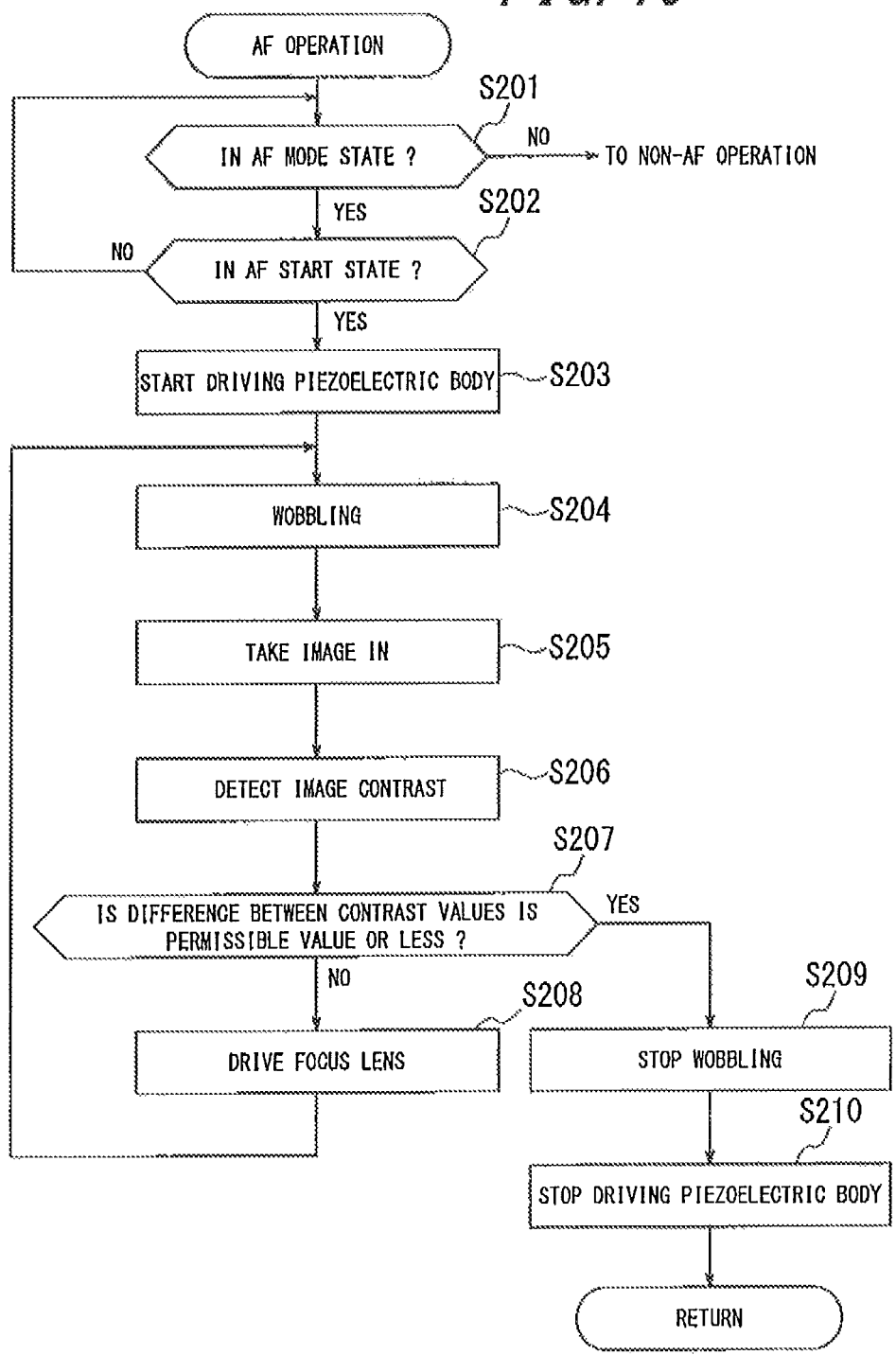
FIG. 19 is a flowchart for illustrating in detail the automatic focusing operation of FIG. 18.

In the following, referring to the flowcharts of FIGS. 18 and 19, an operation of the camera system 10 is described. FIG. 18 illustrates an operation of the camera system 10 when the driving apparatus of the present invention is applied to the autofocusing (AF) operation of the camera system 10. FIG. 19 illustrates the autofocusing (AF) operation of FIG. 18.

The operation control of the photographing sequence of the camera system 10 of FIG. 18 is mainly performed under the control of the Bucom 101.

First, when the power SW of the camera operation SW 131 of the camera system 10 is operated, the Bucom 101 carries out a predetermined initial setting sequence for starting the camera system (Step S101). In this initial setting sequence, the Bucom 101 reads out necessary control parameters from the non-volatile memory 128.

Next, the Bucom 101 detects the presence or absence of accessories such as a flash unit and an electronic view finder connected to a connector (not shown) (Step S102).

Further, the Bucom 101 detects the states of the switches of the camera operation SW 131 (Step S103). Examples of the switches to be subjected to the state detection include a switch for switching between the recording mode and the reproduction mode and a switch for switching between the moving image and the still image. The camera operation SW 131 is not limited to a switch implemented by hardware, and may also include a software-based switch.

After that, the Bucom 101 detects whether the camera system 10 is in the reproduction mode or in the recording mode (Step S104). When the camera system 10 is in the reproduction mode, a moving image or still image reproduction program is started so as to display, on the image display device 123, a selection screen showing reproducible images, and image reproduction is carried out according to an instruction from a user (Step S105). The reproduction mode is not directly related to the subject application, and therefore the detailed description thereof is omitted.

Next, when not in the reproduction mode, it is detected whether the camera system is either in the still image photographing mode or in the moving image photographing mode. Specifically, of the camera operation SW 131, a moving image button for switching between the moving image and the still image is subjected to ON/OFF detection (Step S106). When the moving image button is turned ON, a recording flag is reversed, the recording flag indicating whether a moving image is being recorded or not (Step S107). In other words, each time the moving image button is turned ON, the ON/OFF of the recording flag is switched. Next, the recording flag is detected (Step S108). When the recording flag is ON, auto exposure (AE) processing is performed (Step S109), and the AF operation using wobbling is performed thereafter (Step S110).

FIG. 19 is a flowchart for illustrating the AF operation (Steps S110 and S116) of FIG. 18. In the AF operation, the imaging optical system is configured so that a micro movement of the image pickup device 117 having an image sensor in the optical axis O1 direction becomes optically equivalent to a micro movement of a focusing lens (not shown) in the optical axis direction, and a direction in which the focal position of the focusing lens exists is identified based on the AF evaluation value (contrast value) at a position where the image pickup device 117 is located after being micro-moved in the optical axis direction, to thereby move the focusing lens.

First, the Bucom 101 detects whether the camera system is in the AF mode state (Step S201). When not in the AF mode state, an operation for non-AF mode is carried out. The processing for the non-AF mode is not directly related to the present invention, and therefore the description thereof is omitted.

When the camera system is in the AF mode state, it is detected next whether the camera system is in the AF start state (Step S202). In this step, for example, it is detected, in the case of photographing a still image, whether a first release button is in the ON state or not, to thereby determine whether the camera system is in the AF start state. When in the AF start state, the Bucom 101 drives the piezoelectric body 312 of the transducers 310a to 310c (165) to vibrate (Step S203), to thereby reduce the frictional force Ff acting in the Z-axis direction (pressing direction) between the contact bodies 311a to 311c and the slide plates B 316a to 316c. Here, the reduction of the frictional force Ff causes the holder 145 to move in the direction of gravitational force in the XY plane.

In view of this, the VCMs 320a, 320b, 321a, and 321b are driven simultaneously, to thereby perform position control of the holder 145. For example, a wobbling operation can be performed while performing a shake correction operation.

Next, the displacement in the Z-axis direction (pressing direction) of the support plane formed by the contact bodies 311a to 311c are varied under the control of the Bucom 101, to thereby wobble the image pickup device 117 (Step S204). The wobbling is changed by changing, as illustrated in FIG. 13, the amplitude of the alternating-current component of a voltage to be applied to each of the piezoelectric bodies 312a to 312c so as to change the vibration amplitude of each of the contact bodies 311a to 311c. Further, as illustrated in FIG. 14, the direct-current component of a voltage to be applied to each of the piezoelectric bodies 312a to 312c may be changed so as to displace the vibration center of each of the contact bodies 311a to 311c.

The Bucom 101 moves the position of the focusing lens through wobbling, to thereby take images by the image pickup device 117 a plurality of times (for example, three times) (Step S205). Based on the images thus taken, the image processor 126 detects contrast values of the images (Step S206). The difference between the maximum value and the minimum value of the contrast values is compared with a permissible value (Step S207). When the difference is larger than the permissible value, the difference in contrast value tells the direction in which the focus position of the focusing lens exists, so that the Bucom 101 causes the Lucom 201 to drive the focusing lens in the direction of the focal position by a lens driving mechanism (not shown) (Step S208). In this manner, the focusing lens can be brought closer to the focal position.

The Bucom 101 repeatedly carries out the processing from Steps S204 to S208 until the difference in the obtained contrast values becomes equal to or smaller than a predetermined permissible value (Step S207), and then the Bucom 101 stops the AF processing determining that the contrast is at its best, that is, in the focused state. At this time, the Bucom 101 first stops wobbling (Step S209). Further, the driving of the piezoelectric bodies 312a to 312c of the transducers 310a to 310c is stopped (Step S210), and the position in the Z-axis direction of the image pickup device 117 returns to a position before the driving of the transducers 310a to 310c. In order to hold the position in the Z-axis direction of the image pickup device 117 at a predetermined position, a predetermined direct-current voltage corresponding to a desired displacement can be applied to the piezoelectric bodies 312a to 312c of the transducers 310a to 310c.

Next, as illustrated in FIG. 18, after the AF operation is completed (Step S110), moving image photographing (Step S111) is performed. The moving image thus taken is processed by the image processor 126 (Step S112), and recorded on the recording medium 127 (Step S113).

After that, it is determined that the power is ON unless power-OFF operation is performed (Step S121), and the processing of the Bucom 101 returns to Step S104. Unless no particular operation is performed, the processing goes through the Steps S104, S106, and S108 so as to repeat the operation from the AE operation (Step S109) to the image recording (Step S113), to thereby continue the moving image photographing.

Next, when the moving image button is operated in the above-mentioned moving image photographing mode, the Bucom 101 detects that the moving image button is turned ON (Step S106), and reverses the recording flag (Step S107). As a result, it is determined that the camera system is not in the moving image recording state (Step S108), and the processing proceeds to a still image photographing mode, and the photographing and recording of a moving image is terminated. However, the image display device 123 continues moving image display (live view display) until the power is turned OFF in Step S121.

In the still image photographing mode, the Bucom 101 detects whether the release SW is pressed halfway by a photographer, that is, whether the first release button is turned ON (Step S114). When it is detected that the first release button is turned ON, the auto exposure (AE) processing is performed (Step S115), and the AF operation using wobbling is performed thereafter (Step S116). In Step S116, the AF operation of FIG. 19 is performed. At this time, an image taken in Step S205 is displayed on the image display device 123.

Next, as illustrated in FIG. 18, when the AF operation is completed (Step S116), the Bucom 101 returns to Step S104, via Step S121 in which the power OFF is detected. Unless a user does not change the mode, the processing is carried out via Step S104, Step S106, and Step S108, and it is detected again in Step S114 whether the first release button is turned ON. Here, the first release button has already been turned ON, the processing branches to "NO".

Next, the Bucom 101 detects the operation of a second release button, which is a full-pressing operation of the release SW (Step S117), and when the second release button is turned ON, still image photographing is performed (Step S118). The image data obtained in Step S118 is transmitted through the image pickup device interface circuit 122 to be processed in the image processor 126 (Step S119), and displayed on the image display device 123 while being recorded on the recording medium 127 at the same time (Step S120).

On the other hand, when the second release button is OFF in Step S117, the processing returns to Step S104 via Step S121, and the processing of Steps S104, S106, S108, S114, S117, and S121 is repeated unless no particular operation is performed. In the still image photographing mode, an image taken by the AF operation (Step S116) is displayed on the image display device 123 when the first release button is ON, and each time the second release button is turned ON, the still image photographing and recording (Steps S118 to S120) is performed for each frame.

After the image recording in the moving image or still image photographing mode (Step S113 and Step S120), the camera system 10 performs image reproduction and still image/moving image photographing until the power OFF is detected (Step S121). When the power OFF is detected, termination processing is performed as appropriate, so as to stop power feeding to each component of the camera.

As described above, according to this embodiment, in the camera system 10, the transducers 310a to 310c are changed in vibration amplitude or displacement of the vibration center, to thereby change the displacement in the Z-axis direction of the image pickup device 117 having an image sensor, relative to the frame 167, and detects a focal direction based on the contrast values of images obtained from the image sensor, which allows focusing adjustment to be performed while employing a simple configuration similar to that of the first embodiment. Therefore, the camera system 10 is capable of carrying out both the camera shake correction and the autofocusing through wobbling, while using the driving apparatus 300 which is simple in configuration. Further, the use of the VCM and the piezoelectric body allows the position control of the image pickup device 117 to be performed with high accuracy. Further, in this embodiment, the wobbling mechanism is provided on the body unit 100 side, and hence, this embodiment can provide high-speed, highly-accurate contrast autofocusing, regardless of which lens unit is used.

Further, a VCM is used for driving in a direction along the XY plane while using a piezoelectric element for driving in the Z-axis direction, to thereby realize a three-dimensional stage that is compact in size and allows precise position adjustment to be made.

In FIGS. 2, 3, and 4, three transducers 310a, 310b, and 310c are provided. These transducers are controlled independently of one another in the Z-direction, to thereby adjust the tilt of the holder 145. As described above, precise control can be performed at a level of several μm, so that the amount of tilt of the optical axis and the image pickup device stored in the lens unit or the body of the camera system resulting from the manufacturing of the lens unit or the body, can be corrected through the control of the transducers 310a, 310b, and 310c. A manufacturing error of a focus position in the Z-axis direction can be compensated by various ways. The correction can of course be made when the holder 145 is operated in the XY plane for the purpose of a camera shake correction, and also be realized without operating an actuator such as a VCM when applying a direct-current voltage to the piezoelectric bodies 312a, 312b, and 312c.

<Third Embodiment>

A third Embodiment is different from the first embodiment in configuration of the transducers of the driving apparatus and the periphery thereof. FIGS. 20A and 20B are views illustrating a configuration of a main part of a driving apparatus according to the third embodiment of the present invention. FIG. 20A illustrates a configuration of the transducer 310a of FIG. 2 and the periphery thereof. FIG. 20B is a sectional view taken along the line E-E' of FIG. 20A.

In the first embodiment, as illustrated in FIG. 3, the holder 145 is pressed against the frame 167 from front, by means of the holddown springs 313 fixed to the frame 167. In this embodiment, as illustrated in FIGS. 20, a pressing force is generated by a both-end-support pressing spring 318 having a transducer 310a adhered thereto by means of an adhesive or the like. In the following, the differences from the first embodiment are described.

First, the outer edge of the frame 167 extends forward in the Z-axis direction, and has a front fixed frame 150 fixed at the forefront thereof by means of a screw 317. The piezoelectric body 312a is disposed so as to penetrate a hole formed in the frame 167. A ring shaped rubber 151 is arranged on the outer periphery of the piezoelectric body 312a at the midpoint in the Z-axis direction, and the outer circumference of the rubber 151 is fixed to the inner periphery of the hole. The rubber 151 suppresses vibration of the forward end of the transducer 310a (contact body 311a of the transducer 310a) in a direction along the XY plane, without inhibiting vibration of the transducer 310a in the Z-axis direction. The rubber 152 may be formed of any material including a resin material such as urethane, cork, felt, or sponge, rather than rubber, as long as the material has a vibration damping property. Further, the frame 167 has the pressing spring 318 fixed thereto by means of screws 152a, 152b, so as to press the transducer 310a at an end opposite to the contact body 311a. Due to the pressing spring 318, the contact body 311a fixed to the leading end of the transducer 310a is pressed, with a predetermined amount of force, against the slide plate B 316a adhered to the holder 145 disposed between the front fixed frame 150 and the frame 167. On the other hand, the holder 145 has the slide plate A 315a adhered in front thereof, and is clamped in between the frame 167 and the front fixed frame 150 via the ball 314a as a rolling member.

When the transducer 310a is stopped, the holder 145 has a large frictional force generated between the contact body 311a and the slide plate B 316a, and thus the holder 145 is prevented from moving in the XY plane. A rolling friction between the ball 314a and the slide plate A generates a frictional force on the ball 314a side, which is rather small. However, the frictional force generated on the transducer 310a side is very large, which leads to a large holding force acting as a whole.

On the other hand, when the transducer 310a is in operation, the transducer 310a is vibrated to be displaced relative to the fixed frame, which can reduce to small the frictional force between the contact body 311a and the slide plate B 316a. In this case, the transducer 310a in operation in a direction along the XY plane causes a small frictional force to be generated between the ball 314a and the slide plate A 315a, and hence the ball 314a may preferably be held in the form of FIGS. 20. Other configurations and effects are similar to those of the first embodiment. Therefore, the same components are denoted by the same reference symbols, and the description thereof is omitted.

According to this embodiment, when the transducer 310a vibrates relative to the frame 167, the relative positional movement between the slide plate B 316a and the contact body 311a reduces the frictional force between the slide plate B 316a and the contact body 311a, as in the first embodiment. As a result, the driving apparatus 300 is capable of moving and displacing the image pickup device 117 with a larger drive force at the time of driving for the purpose of camera shake correction, whereas the image pickup device 117 can be precisely held in position when stopped. Further, this embodiment is configured to allow only the rolling friction of the ball 314a to act between the front fixed frame 150 and the slide plate A 315a, to thereby further reduce the frictional force.

Further, in this embodiment, the front fixed frame 150 is fixed to the holder 145 with the ball 314a being interposed therebetween, and hence the holder 145 is capable of being displaced only in the direction along the XY plane, without being displaced in the Z-axis direction. Therefore, this embodiment is particularly suited for applications in which the displacement in the Z-axis direction is undesirable.

It should be noted that the present invention is not limited to the above-mentioned embodiments, and may be subjected to various modifications and alterations. For example, the driving apparatus of the present invention can be applied, not only to the camera system illustrated in the embodiments, but also to various fields involve driving in the XY plane and in the Z-axis direction, such as a stage of a toolmaker's microscope.

Also, the first driving mechanism is not limited to a VCM, and various actuators such as a rotary motor, a linear motor, and an ultrasonic motor can be employed. Further, the second driving mechanism is not limited to the one using a piezoelectric body, and there may be employed various driving mechanisms that are capable of vibrating. For example, vibration can also be generated through the rotation of an eccentric member using a known motor.

Further, in the above-mentioned embodiments, the first member is configured as a frame serving as a fixed frame while the second member is configured as a holder serving as a movable frame. However, there may be adopted another configuration in which the first member is configured as a movable frame while the second member is configured as a fixed frame. In this case, for example, the movable frame is provided with a transducer, and the fixed frame is provided with a slide plate at a position opposing to a contact body of the transducer.

Further, the transducer may not include a contact body, and the piezoelectric body may have a contact portion to be brought into contact with the slide plate, formed of a plastic engineering material or the like, to thereby allow the piezoelectric body to be directly abutted to the slide plate. Therefore, the contact portion of the present invention is not limited to the contact body illustrated in the embodiments. Further, the slide plate can be omitted depending on the materials of the holder and the frame, or through the surface treatment. In addition, a voltage to be applied to the piezoelectric body is not limited to a sinusoidal-wave voltage, and may also be a rectangular-wave or triangular-wave voltage.

Further, even in the first and second embodiments, the holder may be pressed via a ball as in the third embodiment. The number of the contact portions and the transducers is not limited to three, and may be any number other than three. For example, if the contact portion has a large flat contact plane, a single contact portion is sufficient to hold the support plane. In such a case, only one contact portion may be provided.

DESCRIPTION OF SYMBOLS 1 coil
2 magnet
3a, 3b yoke
4, 14, 145 holder (movable frame)
5, 15, 167 frame (fixed frame)
10 camera system
11, 310a, 310b, 310c transducer
12, 312a, 312b, 312c piezoelectric body
13, 311a, 311b, 311c contact body
16, 313a, 313b, 313c spring (holddown spring)
100 body unit
101 Bucom (body control micro computer)
102 communication connector
108 shutter
112 shutter charge mechanism
113 shutter control circuit
117 image pickup device
118 optical filter
119 dust-proof filter
123 image display device
126 image processor
128 non-volatile memory (storage portion)
135 power supply circuit
145 holder
159 image pickup device moving mechanism
163 X-axis actuator
164 Y-axis actuator
165 transducer
168 position detection sensor
169 actuator drive circuit
200 lens unit
201 Lucom (lens-control micro computer)
202 photographing lens
203 diaphragm
300 driving apparatus
314a, 314b, 314c ball
315a, 315b, 315c slide plate A
316a, 316b, 316c slide plate B
320a, 320b VCM-XA, VCM-XB
321a, 321b VCM-YA, VCM-YB
500 piezoelectric body control circuit

What is claimed is:
1. A driving apparatus, comprising:
a first member;
transducers supported by the first member, a contact portion being adhered to each of the transducers;
a second member pressed against the contact portion to be supported thereby;

a slide body adhered to the second member; and a first driving mechanism driven by a motor for moving the second member relative to the first member in a direction along a support plane formed by the contact portion;

wherein the transducers constitute a second driving mechanism for displacing, relative to the first member, the contact portion in a pressing direction perpendicular to the support plane formed by the contact portion, and wherein the second driving mechanism vibrates the contact portion in the pressing direction so as to reduce a frictional force between the contact portion and the slide body, and the first driving mechanism moves the second member.

2. The driving apparatus according to claim 1, wherein the second driving mechanism displaces, in the pressing direction, the support plane supporting the second member.

3. The driving apparatus according to claim 2, wherein the contact portion is changed in vibration amplitude so as to control the displacement of the support plane.

4. The driving apparatus according to claim 2, wherein the contact portion is displaced in vibration center so as to control the displacement of the support plane.

5. The driving apparatus according to claim 1,
wherein the second driving mechanism includes a piezoelectric body adhered to a damping member fixed to the first member; and
wherein the contact portion is a contact body adhered to the piezoelectric body.

6. The driving apparatus according to claim 1, further comprising a plurality of the contact portions and a plurality of the second driving mechanisms,
wherein the contact portions are made different from one another in vibration amplitude or displacement of the vibration center, so that the tilt of the second member with respect to the first member is adjusted.

7. An imaging apparatus, comprising:
a fixed frame fixed to a main body;
a shake detector which is fixed to the main body and detects a shake;
transducers supported by the fixed frame, a contact portion being adhered to each of the transducers;
a movable frame pressed against the contact portion to be supported thereby;
a slide body adhered to the movable frame;
an image sensor fixed to the movable frame;
a photographing optical system which is supported by the main body and has an optical axis in a direction perpendicular to a support plane formed by the contact portion, the photographing optical system forming an object image on the image sensor; and
a first driving mechanism driven by a motor for moving the movable frame in a direction perpendicular to the optical axis of the photographing optical system;
wherein the transducers constitute a second driving mechanism for displacing, relative to the fixed frame, the contact portion in the optical axis direction, and
wherein the second driving mechanism moves the contact portion in the optical axis direction so as to reduce a frictional force between the contact portion and the slide body, and
wherein the first driving mechanism moves the image sensor so as to compensate the shake based on a signal from the shake detector.

8. An imaging apparatus, comprising:
a fixed frame fixed to a main body;
transducers supported by the fixed frame, a contact portion being adhered to each of the transducers;
a movable frame pressed against the contact portion to be supported thereby;
a slide body adhered to the movable frame;
an image sensor fixed to the movable frame;
a photographing optical system which is supported by the main body and has an optical axis in a direction perpendicular to a support plane formed by the contact portion; the photographing optical system forming an object image on the image sensor; and
a first driving mechanism driven by a motor for moving the movable frame in a direction perpendicular to the optical axis of the photographing optical system;
wherein the transducers constitute a second driving mechanism for displacing, relative to the fixed frame, the contact portion in the optical axis direction, and
wherein the second driving mechanism vibrates the contact portion in the optical axis direction so as to reduce a frictional force between the contact portion and the slide body, and the first driving mechanism moves the second member, and the contact portion is changed in vibration amplitude or displacement of the vibration center, so as to displace, relative to the fixed frame, the image sensor in the optical axis direction of the optical system, to thereby detect a focus position.

* * * * *